(12) United States Patent
Young

(10) Patent No.: US 8,226,799 B1
(45) Date of Patent: Jul. 24, 2012

(54) VACUUM DISTILLATION DEVICE AND METHOD FOR THE TREATMENT OF NON-POTABLE WATER

(76) Inventor: Anthony D. Young, Corydon, IN (US)

(*) Notice: Subject to any disclaimer, the term of this patent is extended or adjusted under 35 U.S.C. 154(b) by 413 days.

(21) Appl. No.: 12/483,124

(22) Filed: Jun. 11, 2009

(51) Int. Cl.
*B01D 1/28* (2006.01)
*B01D 3/10* (2006.01)
*B01D 1/00* (2006.01)

(52) U.S. Cl. ........ 202/205; 202/187; 202/188; 202/189; 159/24.2; 203/10; 203/11

(58) Field of Classification Search .............. 203/26, 203/10, 11; 202/180, 185.1, 185.5, 185.6, 202/187, 205, 188, 189; 159/23, 24.3, 24.2, 159/13.3, 27.1, 27.3, 27.5
See application file for complete search history.

(56) References Cited

U.S. PATENT DOCUMENTS

| | | | |
|---|---|---|---|
| 849,579 A * | 4/1907 | Siebel | 203/26 |
| 1,150,713 A * | 8/1915 | Soderlund | 159/24.1 |
| 3,385,768 A * | 5/1968 | Yost | 202/186 |
| 3,415,721 A * | 12/1968 | Bie, Jr. | 202/187 |
| 3,528,890 A | 9/1970 | Brown | |
| 3,558,436 A * | 1/1971 | Foley | 202/196 |
| 3,578,071 A * | 5/1971 | Johnston | 165/66 |
| 3,674,652 A | 7/1972 | Brown | |
| 3,817,051 A | 6/1974 | Seliber | |
| 3,846,254 A * | 11/1974 | Sephton | 203/11 |
| 3,859,069 A | 1/1975 | Seliber | |
| 4,148,693 A | 4/1979 | Williamson | |
| 4,186,060 A | 1/1980 | Katz et al. | |
| 4,302,297 A * | 11/1981 | Humiston | 202/185.1 |
| 4,319,964 A | 3/1982 | Katz et al. | |
| 4,440,601 A | 4/1984 | Katz et al. | |
| 4,482,432 A * | 11/1984 | Caffes | 202/187 |
| 4,668,345 A * | 5/1987 | Warren | 202/182 |
| 5,211,816 A | 5/1993 | Youngner | |
| 6,051,111 A | 4/2000 | Prestidge | |
| 6,303,006 B1 * | 10/2001 | Chang et al. | 203/1 |

FOREIGN PATENT DOCUMENTS

DE 1934011 7/1970

* cited by examiner

*Primary Examiner* — Duane Smith
*Assistant Examiner* — Patrick McCarty
(74) *Attorney, Agent, or Firm* — Robert H. Eichenberger; Chad D. Bruggeman; Middleton Reutlinger

(57) ABSTRACT

An embodiment of a distillation system is disclosed having an influent column with an influent column first end and an influent column second end and having therein, a gas deflector. The influent column may contain at least an influent liquid and vapor from the influent liquid. The influent column first end may be in fluid communication with an influent liquid source. A distillation system is disclosed as having at least one effluent column having an effluent column first end and an effluent column second end and further comprising a condensation chamber adjacent the effluent second end. The effluent column may be positioned within the influent column and may contain at least an effluent liquid and vapor. A primary vacuum source may be in fluid communication with an influent column and positioned at an influent second end. A blower may be provided and connected to the condensation chamber. The influent column may have at least one vertically positioned influent conduit. The effluent column may have one or more vertically positioned effluent conduits. A method of distillation is also disclosed.

27 Claims, 16 Drawing Sheets

VACUUM DISTILLATION DEVICE AND METHOD FOR THE TREATMENT OF NON-POTABLE WATER

TECHNICAL FIELD

This invention pertains to liquid distillation.

BACKGROUND

Non-consumable water is in abundance, but clean water is not. Clean water is vital to humans and has been described as the Oil of the 21$^{st}$ Century. Clean is defined here as pure enough to be used for irrigation and watering livestock. The world is becoming more populous, and the water needed to sustain and feed that population is becoming scarce. In response to this imminent clean-water crisis, governments are tightening both drinking water and wastewater regulations. The natural result of this increase in treatment requirements is an increase in treatment costs.

Distillation has long been used to purify liquids, extract solutes, and concentrate substances from solution. The three most common distillation technologies are: multiple effect evaporation, multistage flash evaporation, and vapor-compression distillation.

As used herein, "distillation" is the volatilization or evaporation and subsequent condensation of a liquid solvent for the purpose of separating the solvent from the solution. Distillation is used in many industries, from oil refineries that use distillation to acquire gasoline from crude oil, to alcoholic beverage makers that use distillation to extract alcohol from mash. Historically, distillation was rarely used for treating water because the cost of distillation exceeded the cost of other, more traditional, forms of treatment.

The process of distillation is typically performed by adding heat to the solution (influent) at atmospheric pressure until the solvent (water) vaporizes. Other traditional methods use high pressure pumps and nozzles to create pressure gradients. Still other methods involve refrigeration units to remove energy from the system to freeze portions of the influent in order to create ice crystals. Still other systems use electrolysis to produce water vapor from water.

The Achilles heel of these distillation processes is the quantity of energy necessary to convert liquid water to a vapor. Additionally, these common technologies require pretreatment of the influent which makes the process even more expensive. And, these traditional methods generate effluents having characteristics that depend directly on the particular type of influent used. For example, feedwater supplied to the unit may contain volatile organic compounds (VOCs).

In addition, as a wastewater process, conventional distillation may not meet the discharge requirements for dissolved oxygen content, pH, temperature, and VOCs. The effluent from landfills is likely to have the highest concentration of VOCs. Given this reality, landfill effluent should preferably be pretreated with aeration prior to distillation or double-distilled to produce a higher quality distillate. The additional costs incurred with this step may be offset by the use of landfill gas as a supplementary energy (heat) source.

Minimum dissolved oxygen levels are developed by the authority having jurisdiction on a case-by-case basis. According to the EPA, typical values are between 5 and 7 mg/L.

According to the American Water Works Association, Inc., the target pH for potable water to protect from copper and lead corrosion is 8.0 to 8.5. The pH of distilled water is neutral (7.0) at distillation but, according to the EPA, may quickly become acidic due to $CO_2$ gas dissolving into the distilled water from the air.

Similarly, some jurisdictions have discharge temperature requirements that are specific to the stream and to the flora and fauna within the stream.

If one is to use distillation as part of a drinking water treatment process,

VOCs, pH, fluoridation, and chlorination may need to be addressed prior to distribution.

SUMMARY

An embodiment of a distillation system is disclosed having an influent column with an influent column first end and an influent column second end and having therein, a gas deflector. The influent column may contain at least an influent liquid and vapor from the influent liquid. The influent column first end may be in fluid communication with an influent liquid source. A distillation system is disclosed as having at least one effluent column having an effluent column first end and an effluent column second end and further comprising a condensation chamber adjacent the effluent second end. The effluent column may be positioned within the influent column and may contain at least an effluent liquid and vapor. A primary vacuum source may be in fluid communication with an influent column and positioned at an influent second end. A blower may be provided and connected to the condensation chamber. The influent column may have at least one vertically positioned influent conduit. The effluent column may have one or more vertically positioned effluent conduits. A method of distillation is also disclosed.

Another embodiment of the present invention provides a single stage low-temperature, partial-vacuum distillation system for the transformation of certain polluted waters into unregulated effluents. Another embodiment of the present invention provides a method of the transformation of certain polluted waters into water suitable for discharge, irrigation, or consumption.

A first aspect of an embodiment of the present invention provides a distillation system having an influent flow or stream of liquid and an effluent flow or stream of liquid, and vapor from the influent liquid. A distillation system of the present invention may also be provided with one or more vertically positioned columns to contain the influent liquid and one or more vertically positioned conduits or columns to contain the effluent liquid. A primary vacuum may be connected to the apex of the fluid connection between the influent and effluent columns. The vapor is present in the connection between the influent and effluent columns and may be present in both sets of columns. A blower is in fluid communication with both sets of columns, and transfers the vapor from the influent columns to the effluent columns.

Another aspect of an embodiment of the present invention provides a distillation device that reduces the energy requirements by capturing the energy of phase change from the condensate stream. To accomplish this energy capture, the effluent columns may be adjacent to or contained within (e.g. in a shell and tube heat exchanger fashion), the influent column. Additionally, the device does not need pretreatment in order to process wastewater. However, pretreatment may nonetheless be performed, if desired.

Yet another example of an embodiment of the present invention provides a method for distilling water. The method provides an influent source of liquid, the liquid having, for example, non-potable water. The method produces an effluent stream of liquid having, for example, potable or near-potable water. The method further provides a step of employing a primary vacuum to apply a pressure that is less than atmospheric, preferably a pressure near 100% vacuum. The primary vacuum lifts the influent liquid within influent columns to a height sufficient to coincide with phase change from liquid to vapor which is dependent on the temperature and pressure. In most cases, this height will be approximately 25-35 feet for water. The method further provides for drawing vapor off of the influent liquid, passing the vapor through the blower which then pressurizes the vapor. The pressurized vapor condenses (returns to liquid form) on the cooler effluent column walls, which releases the heat of phase change. The method may then transfer the heat from the effluent liquid, through the effluent column walls, to the influent liquid to further facilitate vaporization in the influent stream.

Another embodiment of the present invention provides a distillation system having an influent column with a first end and a second end. The first end of the influent column is fluidly connected to a source of influent liquid. A gas deflector may be provided inside the influent column and have openings therein and vanes thereon to allow the influent liquid to pass therethrough while preventing gases from passing therethrough. The gas deflector is intended to direct gases toward the influent second end. A vacuum source may be fluidly connected to the second end of the influent column via a vapor chamber so as to reduce the pressure within the influent column to below atmospheric conditions. Such subatmospheric conditions may then create a liquid/vapor interface at a location above the first end of the influent column and below the second end of the influent column. A blower may be fluidly connected to the vapor chamber and have an inlet and an outlet. The inlet may receive vapor at a first pressure and through the outlet, produce vapor at a second pressure that is higher than the first pressure. A condensation chamber may be fluidly connected to the blower and receive vapor at the second pressure. The condensation chamber may further have sidewalls that condense the vapor to form an effluent liquid. An effluent cooling coil may be fluidly connected to the condensation chamber to convey the effluent liquid to an effluent liquid receptacle.

Yet another embodiment of a distillation system of the present invention may be provided with a vertically oriented elongated influent column having a first end and a second end. The first end may be fluidly connected to a source of influent liquid. A vacuum source may be fluidly connected to the second end of the influent column to reduce the internal pressure within the influent column below atmospheric pressure to raise a column of influent liquid therein to a vaporization height that represents a maximum height at which point the influent liquid undergoes phase change from liquid to gas at a liquid/vapor interface. The influent column second end may be located vertically higher than the liquid/vapor interface so as to create a vapor chamber within the influent column between the liquid/vapor interface and the second end of the influent column. A blower may be in fluid communication with the vapor chamber to receive vapor at a first pressure and convey the vapor to a condensation chamber at a second pressure. The second pressure is higher than the first pressure and the vapor condenses to form an effluent liquid. An effluent cooling conduit may be provided to receive the effluent liquid from the condensation chamber and convey the effluent liquid to an effluent liquid receptacle.

A further embodiment includes a gas deflector and waste gas separation tube to remove volatile constituents. The gas deflector is situated in the influent column and contains louvered slots to allow water through the deflector while directing the gases towards a gas collection plate. The collection plate is sealed to the top of the gas deflector and directs the gases to one area of the plate where it is vented to the atmosphere preferably with assistance from the primary vacuum.

If temperature targets are set by the authority having jurisdiction, an aeration basin may be employed to meet these requirements. Waste heat may be reduced by using a reduced pressure environment to generate the vapor at a lower temperature and by installing the effluent (warmer) cooling tube inside the influent (cooler) column. This configuration allows excess heat generated to be transferred to the influent stream. This reduces the energy requirements for treatment and reduces waste heat in the effluent stream. Effluent temperature may also be reduced by certain dissolved oxygen infusion techniques as discussed herein.

Because the vacuum process will strip dissolved gases from the influent, the effluent may not meet the dissolved oxygen requirement for most discharge situations. The addition of an effluent cascade, diffuse bubbler, or aeration basin downstream of the distillation apparatus solves this issue. The addition of any of these three treatments downstream of the unit will reduce temperature, improve dissolved oxygen, and reduce any remaining VOCs.

If VOCs are a major issue for the feedwater, aeration for VOC reduction prior to distillation may positively impact the quality of the potable water.

BRIEF DESCRIPTION OF THE ILLUSTRATIONS

Embodiments of the invention are illustrated in the following illustrations.

DETAILED DESCRIPTION

Embodiments of the present invention provide a method and apparatus for distilling non-potable water to potable or near-potable water.

Figure 1:
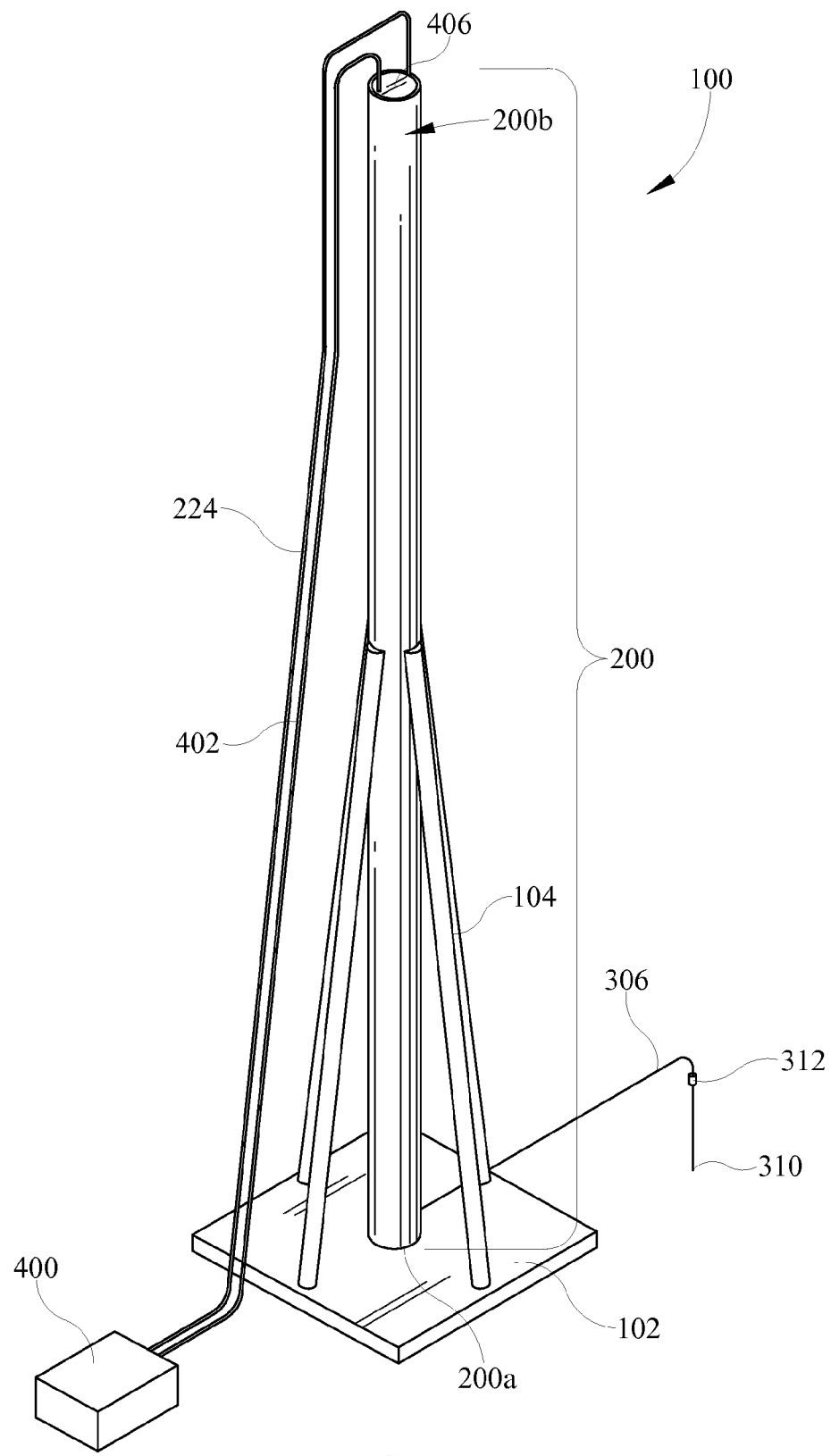
FIG. 1 is a perspective schematic view of an embodiment of a distillation system of the present invention.
Figure 2A:
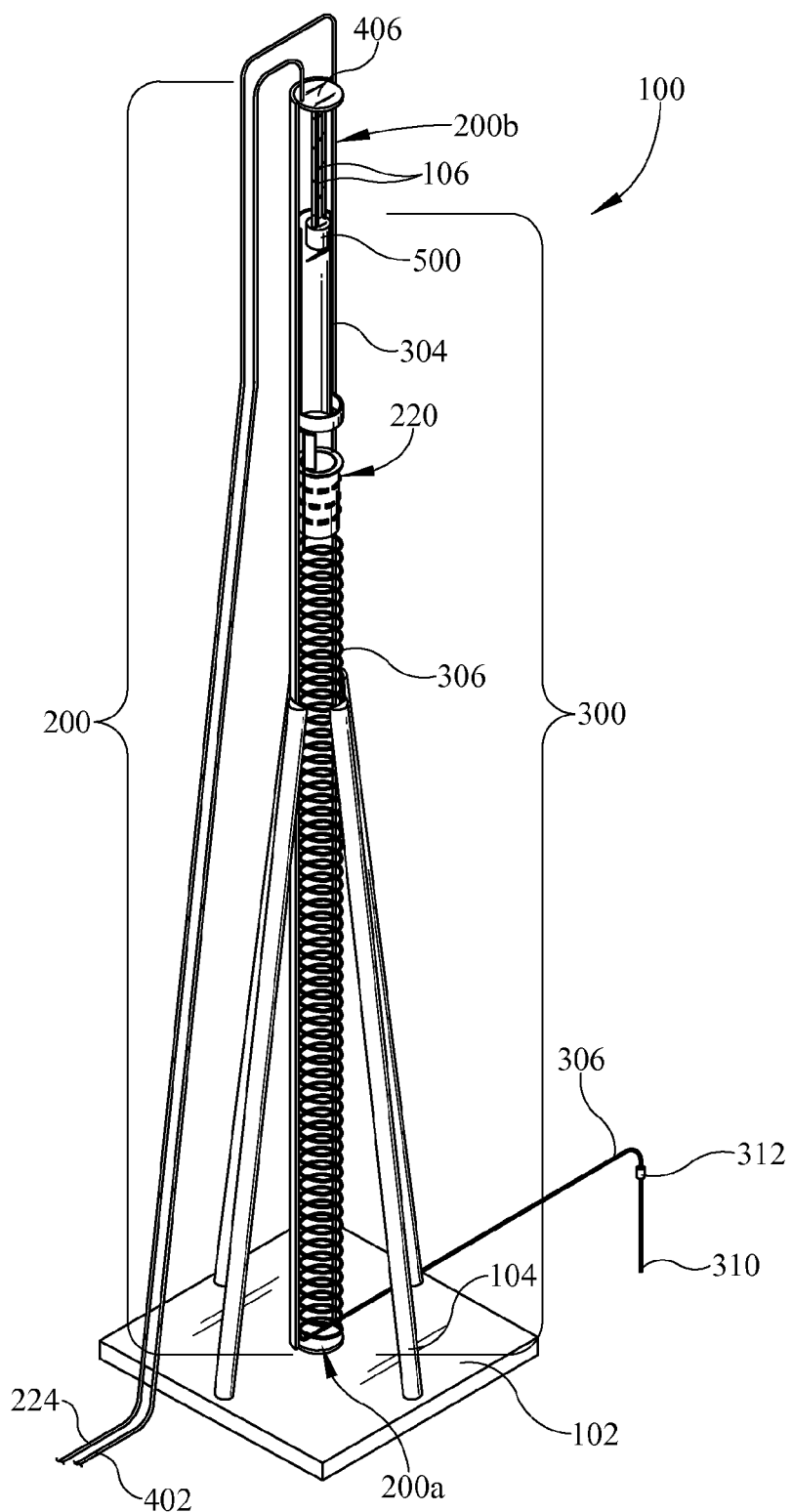
FIG. 2A is a view similar to FIG. 1, but with a portion of the influent column removed for clarity.
Figure 2B:
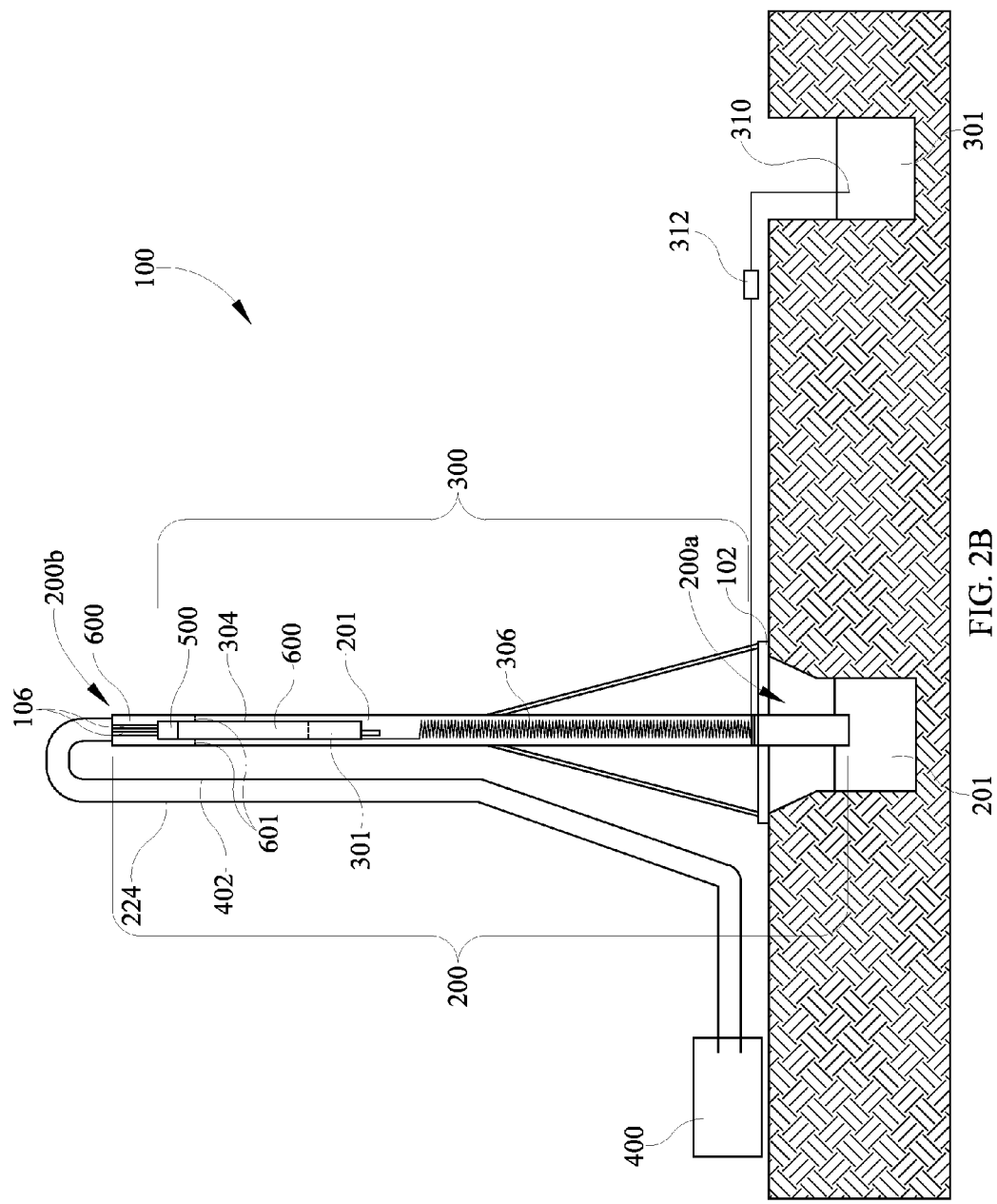
FIG. 2B is a sectional schematic view of the embodiment shown in FIG. 1 with the gas deflector and the waste gas tube within the influent column removed.

Referring now to FIGS. 1-2B, an embodiment of a distillation system 100 of the present invention is provided with an influent column 200, an effluent column 300 positioned within the influent column 200, a primary vacuum source 400, and a blower 500. The influent column 200 and the effluent column 300, respectively, contain an influent liquid 201, and an effluent liquid 301. Both columns 200, 300 may contain vapor 600 that is generated from the influent liquid 201 and then condensed into the effluent liquid 301. The distillation system 100 may also be provided with a platform 102 and support columns 104.

The influent and effluent liquids 201, 301, respectively, are preferably water and the following description is directed to water distillation. Sources of such water may come from many sources, including lakes and rivers, seawater, sewage, landfill or farming run-off, to name a few. Such distillate may be used for irrigation or livestock watering, or as a pretreatment to making potable water. While the following description is directed to water, the distillation of liquids other than water is also conceivable with modifications to the described apparatus.

As used herein, the term "upstream" shall refer to a location or position within the distillation system 100 that is relatively closer to the influent intake 200a. As used herein, the term "downstream" shall refer to a location or position within the distillation system 100 that is relatively closer to the effluent discharge 310.

The influent column 200 is preferably a singular vertically positioned conduit or pipe. However, it is also envisioned that multiple influent columns may exist in a single system. The effluent column 300 generally has a condensation chamber 304 and a cooling coil 306.

The influent column 200 is in fluid communication with the effluent column 300 such that the vapor 600 may be conveyed from the influent column 200 to the effluent column 300. A vacuum is applied at or near the highest point of the influent column 200 and the primary vacuum source 400 may be positioned in any convenient location. As shown in FIGS. 1 and 2B, the primary vacuum source 400 is placed on the ground and connected to the influent column 200 via a conduit 402. The blower 500 is positioned above the high water elevation at or near the highest point of the effluent column 300. The blower 500 is in fluid communication with both the influent column 200 and the effluent column 300.

Figure 3A:
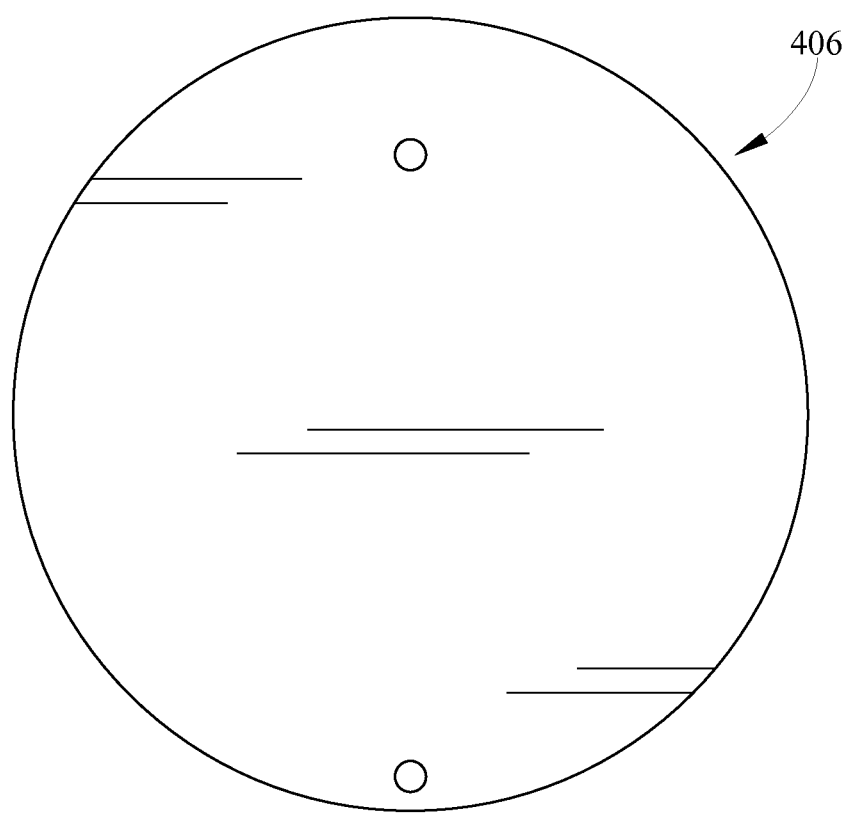
FIG. 3A is a top view of the top plate of an influent column of an embodiment of the present invention.
Figure 3B:
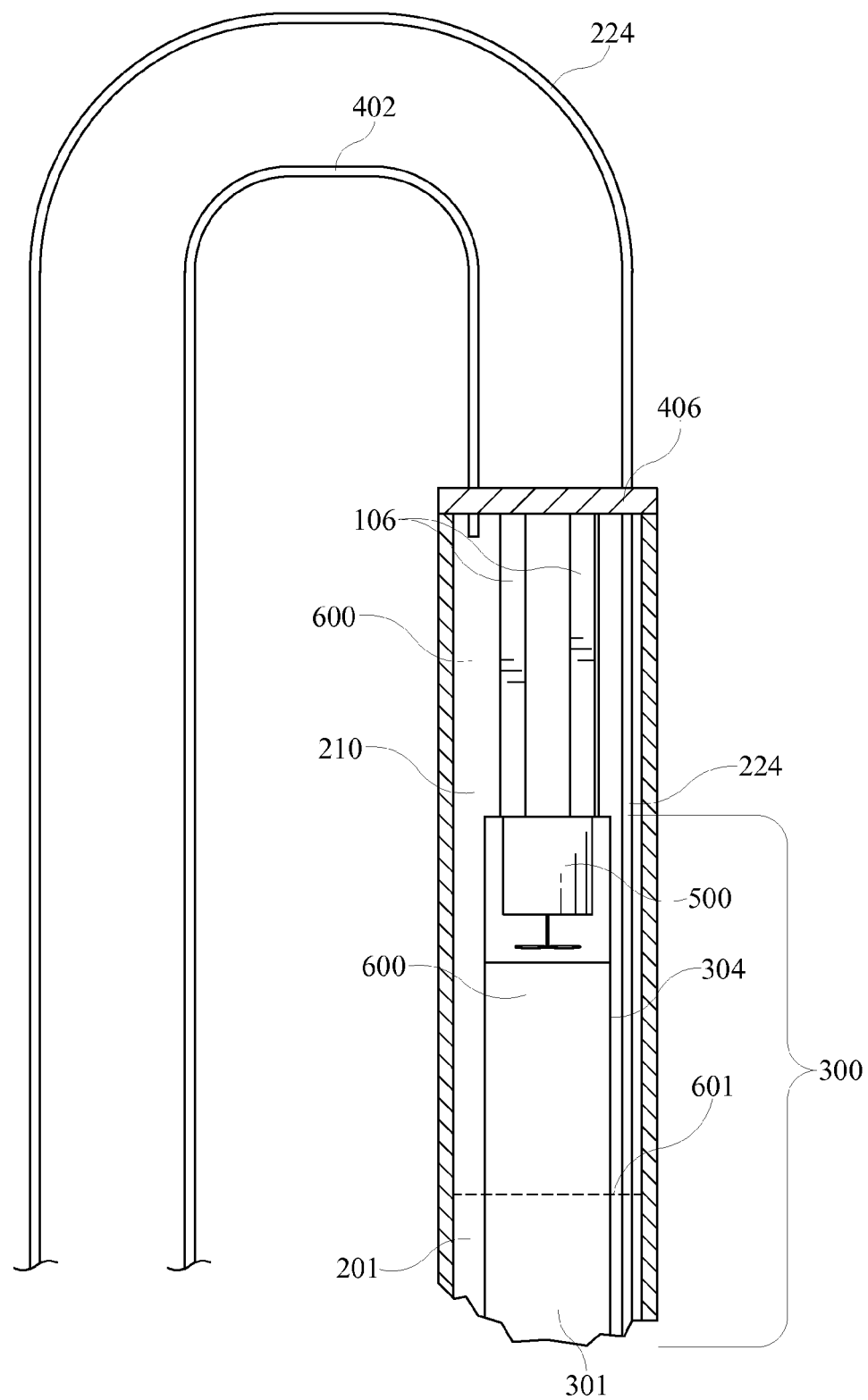
FIG. 3B is an enlarged sectional schematic view of the embodiment of FIG. 2B.

Preferably, the overall system 100 is approximately 40 feet tall. This is largely due to the height of influent column 200, which is the tallest component of the embodiment of the shown distillation system 100. The influent column 200 has a first end 200a and a second end 200b. In one embodiment, the first end 200a is generally at or below ground level, and in fluid communication with a source of influent 201, and the second end 200b is approximately 40 feet above the level of the influent stream and capped and sealed by a top plate 406. It is through this top plate 406 that the primary vacuum 400 may be connected via a conduit 402, see FIGS. 3A and 3B.

The top plate 406 may also provide a pass through for a waste gas tube 224, and a vacuum release valve 212, both of which are explained in detail herein.

To understand why the preferred distillation system 100 is so tall, a general understanding is needed of the thermodynamic and fluid dynamic laws that an embodiment of the present invention employs. A water column under 100% vacuum at any given atmospheric pressure may be determined by the following equation:

$$\text{Height}_{Water\ Column}\ (\text{ft}) = \frac{P_{Atmospheric}\ (lbm_{Water}/\text{in}^2) \cdot 144\ (\text{in}^2/\text{ft}^2)}{62.4\ (lbm_{Water}/\text{ft}^3)}$$

Figure 8A:
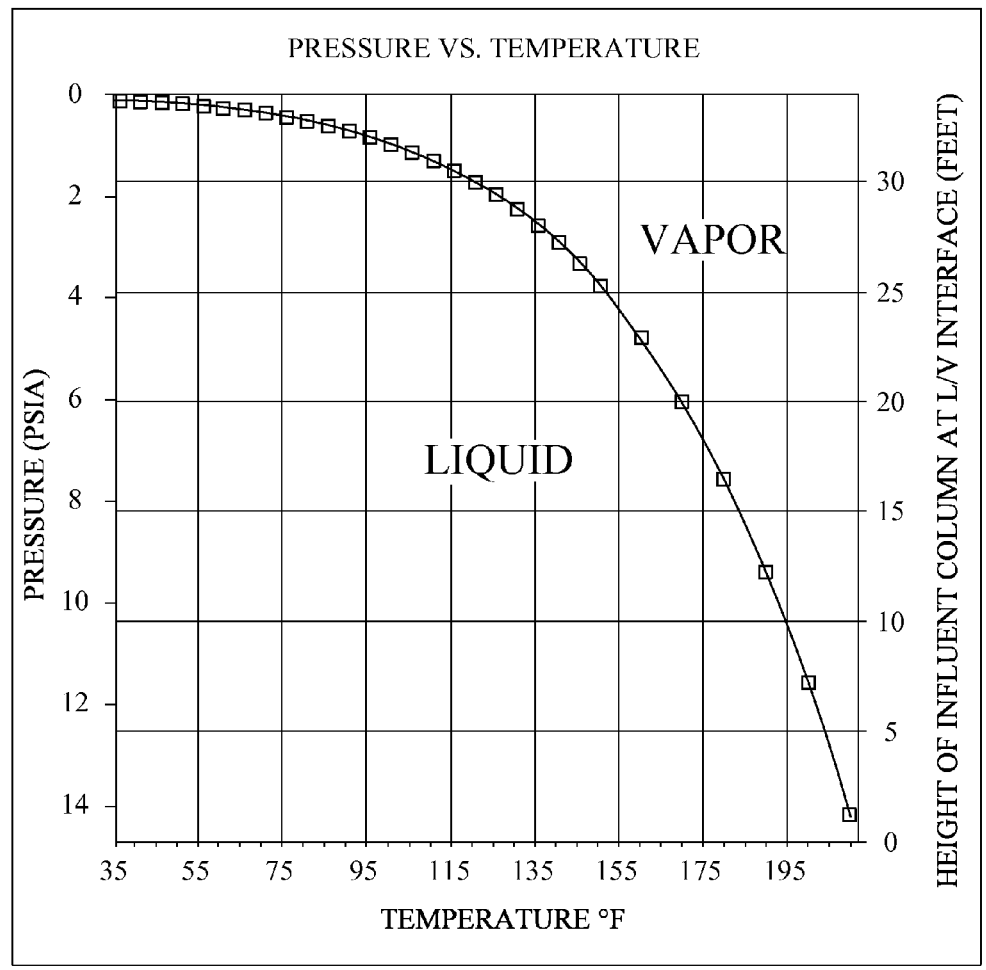
FIGS. 8A and 8B are graphs showing the relationship between temperature and pressure as it relates to liquid water and water vapor and the height of the influent liquid.
Figure 8B:
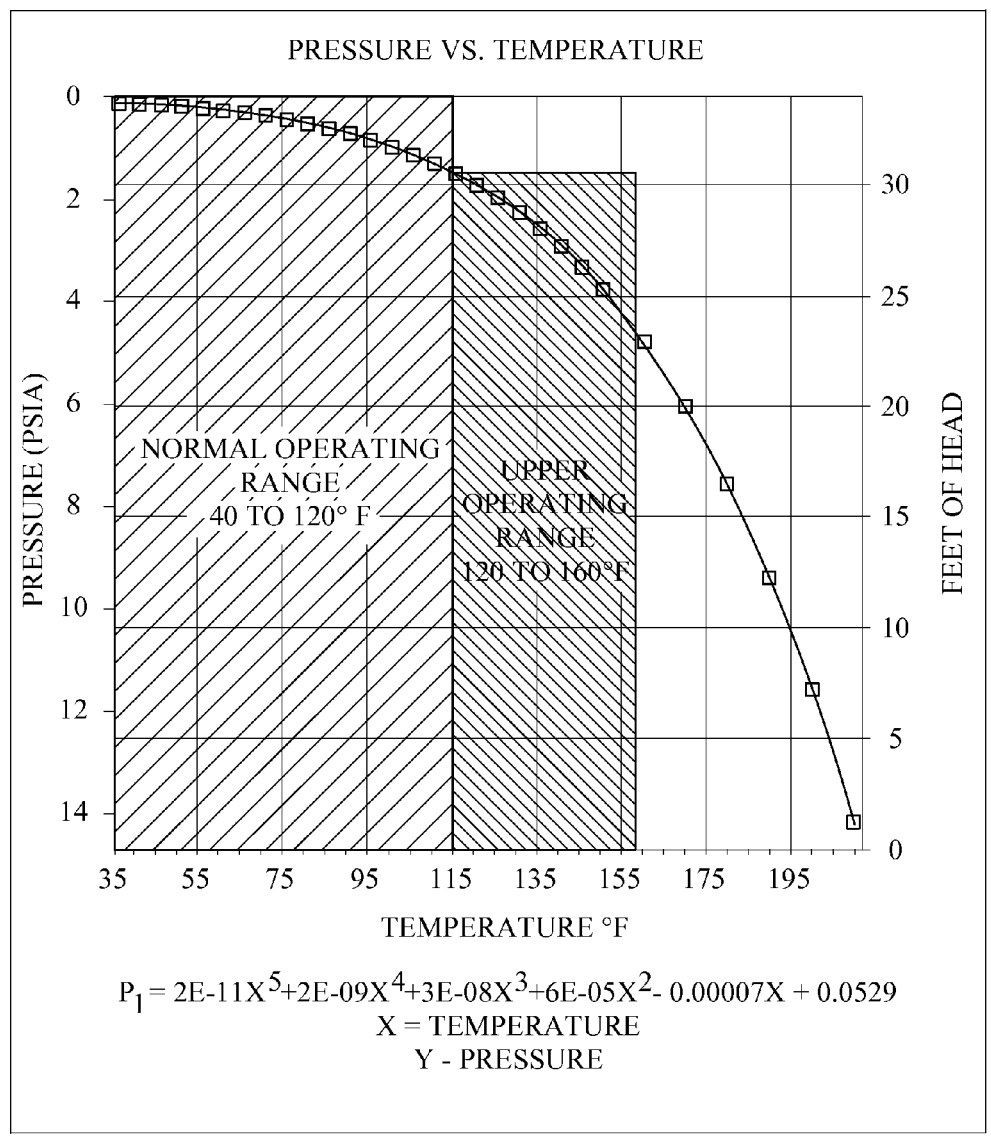

So, with reference to FIGS. 8A and 8B, for water entering the distillation system 100 at atmospheric pressure (approximately 14.7 psi), and having a 100% vacuum applied to the influent column 200, the maximum height of the column is approximately 33.9 ft. Therefore in the preferred embodiment, the influent column 200 is approximately forty feet tall to ensure that there is volume for the vapor 600 to form in a vapor chamber 210 and to ensure that the blower 500 and the primary vacuum 400 are above the highest possible water level.

The vapor 600 forms in the vapor chamber 210 at the liquid/vapor interface 601. This interface 601 is the point where the influent liquid 201 converts to vapor 600. As the pressure is reduced, the temperature at which phase change occurs is also reduced. The following equation, which is represented in FIGS. 8A and 8B, represents the pressure at which the atmosphere inside the influent column 200 must be reduced in order for liquid water to vaporize at a given temperature.

$$y = 2\times10^{-11}x^5 + 2\times10^{-9}x^4 + 5\times10^{-8}x^3 + 5\times10^{-5}x^2 + 0.0005x + 0.0483$$

In this equation, y represents pressure in pounds per square inch absolute (psia), and x represents temperature in degrees Fahrenheit (° F.). As shown in FIGS. 8A and 8B, points located below the curve indicate conditions in which liquid water may exist and points above the curve indicate conditions in which vapor may exist.

Water will change phase from liquid to gas when the atmospheric pressure on the liquid water surface is less than the internal energy of the liquid water. This internal energy correlates to a particular temperature. For example, at standard pressure (14.7 psi), the water changes phase when it reaches a temperature of 212° F. Conversely, at standard temp (70° F.), water changes phase at 0.36 psi. At 40° F., water changes phase at 0.12 psi. For a given temperature and pressure, FIGS. 8A and 8B show the corresponding height of the influent liquid 201 within the influent column 200.

Enthalpy is defined as a quantity associated with a thermodynamic system, expressed as the internal energy of a system plus the product of the pressure and volume of the system, having the property that during an isobaric process, the change in the quantity is equal to the heat transferred during the process. It is also noted that a British Thermal Unit (Btu) is the amount of energy required to heat one pound$_{mass}$ (lbm) of water one ° F. The temperature of the water is a function of its internal energy. The more internal energy possessed by the water, the greater its tendency is to vaporize. As the atmospheric pressure is reduced (the vacuum is increased), the internal energy will eventually overcome the atmospheric pressure. At this point, the water vaporizes. The atmospheric pressure that the influent liquid 201 is exposed to is a function of the height of the water column. The elevation is thus a function of temperature.

Given the above definition of Btu, it takes up to 180 (212° F.-32° F.) Btu of heat to bring one pound of water to the temperature of vaporization at atmospheric pressure. Additionally, it takes approximately another 970 Btu/lbm to move the water from the liquid phase to the gas phase. This additional energy is referred to as the energy of phase change and does not increase the temperature of the water. It just changes the phase of the water. Reducing the atmospheric pressure at the liquid/vapor interface 601 reduces the temperature at which phase change occurs, but it does not reduce the energy necessary to cause phase change. The energy of phase change comes from the environment during evaporation (evaporation is an endothermic reaction), and is released to the environment during condensation (condensation is an exothermic reaction). It is typically noted as enthalpy (hfg) in steam tables. The following equation represents the energy of phase change as a function of temperature, where y is the Enthalpy in Btu/lbm and x represents temperature in ° F.

$$y=0.5809x+1095$$

Figure 9:
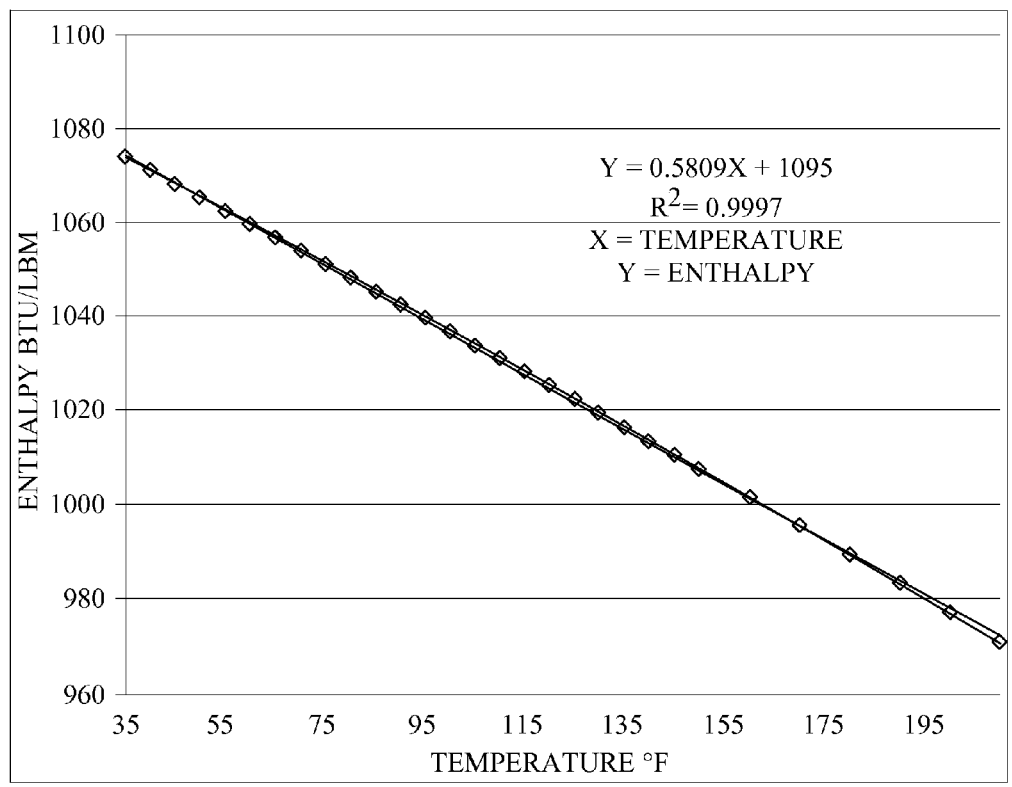
FIG. 9 is a graph showing the enthalpy of water as a function of temperature.

FIG. 9 represents this equation.

A perfect vacuum is not possible given the limitations of and losses of mechanical vacuum pumps. However, a perfect vacuum is not necessary to achieve distillation as envisioned by embodiments of the present invention. The minimum influent temperature is the operational characteristic which determines the choice of target pressure, because the distillation system 100 ideally must operate at the lowest temperature expected for the influent liquid 201, and not just at the average temperature. An alternative to designing to the lowest influent temperature would be to apply supplemental heat in the influent stream.

As shown in FIGS. 8A and 8B, as the pressure is reduced to below 1 psia, the temperature at which the liquid water vaporizes varies between approximately 35° F. and approximately 95° F. Obviously, the higher the temperature of the influent liquid 201, the lower the vacuum requirement and the less energy must be consumed to create the environment conducive to creating water vapor 600. Warm influent also provides efficiency in that the water vapor 600 density will increase proportionately with water vapor 600 temperature. If the water 201 is warmer, the distillation system 100 moves more water mass with each ft$^3$/minute (cfm) of vapor 600. This is important because it means that the same size unit will produce more water per unit time as the temperature of the influent is increased. At approximately 70° F., the liquid water would have to be subject to a vacuum equal to a 33.1 ft. column of water for the liquid to vaporize and it would produce a water vapor 0.00115 lbm/ft$^3$. Conversely, at 100° F., the liquid water would have to be subject to a vacuum equal to a 31.7 ft. column of water for the liquid to vaporize and it would produce a water vapor 0.00285 lbm/ft$^3$. Therefore, this 30° F. increase in influent temperature provides a 250% increase in water treated per unit time. It is appreciated however, that this relationship is not linear. Therefore a 30° F. range for other temperature values may not provide the same 250% increase.

As a result, supplemental heat may be added to the influent liquid 201 to improve the efficiency of the system 100. Supplemental heat may be a powered heat source such as a heating coil. Conversely, a supplemental heat source 202, see FIG. 7, may be from waste heat. Waste heat is an attractive heat supply because, by definition, it has a low operational cost. Waste heat may come from many sources, which may be site specific including, but not limited to: combustion of landfill gas; decomposition heat from landfill operations; production and combustion of methane generated from waste-water treatment plant solids processing; power plants; paper mills; food processing; internal combustion engines and generators; and solar energy. The supplemental heat source 202 might also be the heat generated from the blower 500 or the primary vacuum 400.

Figure 7:
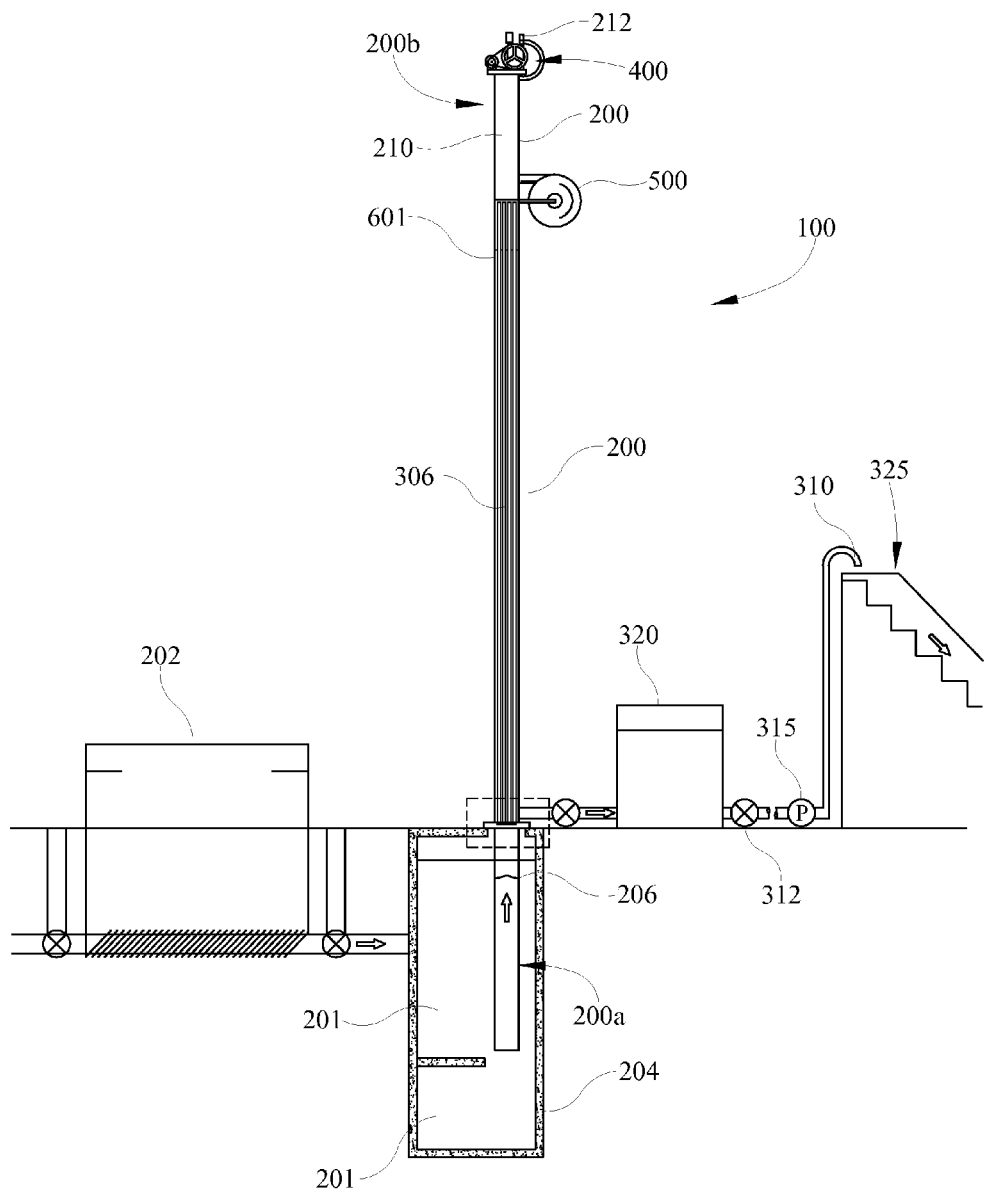
FIG. 7 is a schematic elevation view of another embodiment of the present invention.

Referring now to FIG. 7, some embodiments may include a supplemental heat source 202 (as discussed above), a wet well 204 for collecting solid waste and debris from the influent liquid 201, and a column intake screen 206. The influent liquid 201 preferably enters the influent column 200 through the wet well 204 and then through the column intake screen 206. The wet well 204 is provided as a place for solid waste in the influent liquid 201 to settle out. The column intake screen 206 is simply a trash screen for removing debris that did not settle out in the wet well 204.

A supplemental heat source 202 may, if present, be upstream of the wet well 204 and intake screen 206. Alternatively or additionally, a supplemental heat source 202 may be applied just below the liquid/vapor interface 601. If applied at the interface 601, less energy (heat) is likely to be lost to the surrounding environment, which means more heat will be applied to the influent liquid 201 to be put into the liquid changing phase. However, due to the size of the system 100 and the height of the influent column 200, it may be impractical to place the supplemental heat at the liquid/vapor interface 601.

As stated, the intake screen 206 may be located at or near the influent column first end 200a and downstream of the wet well 204. As a vacuum is applied to the influent column 200, the influent liquid 201 moves up the influent column 200 to a particular height, according to the relationship described in FIGS. 8A and 8B.

With reference to FIGS. 1-3B and 8, the primary vacuum source 400 is applied near the apex of the influent column 200. The primary vacuum 400 provides the source of the vacuum within the influent column 200. Such a primary vacuum 400 may be a positive displacement pump. A positive displacement pump operates by removing a fixed volume of gas from a sealed chamber with each stroke or cycle. The remaining gas within the sealed chamber expands to fill the chamber volume and is therefore minutely less dense with each cycle. A suitable positive displacement pump may be, for example, Welch model 1400N as provided by Gardner Denver Thomas, Inc., of Niles, Ill. Such a displacement pump is capable of providing a flow of 0.9 cubic feet per minute and an ultimate pressure of 0.00013 mbar ($1.9 \times 10^{-6}$ psi). It should be appreciated that multiple vacuum sources may be coupled to a single influent column 200, or a single vacuum source may be coupled to multiple influent columns, or any combination thereof.

Embodiments of the present invention may be provided with a vapor chamber 210. The vapor chamber 210 is defined as the volume of space within the influent column 200 that is not occupied by the influent liquid 201. It is preferably positioned between the top cap 406 and the liquid/vapor interface 601 and may contain the blower 500. The vapor chamber 210 is at a lower pressure than the atmosphere due to the primary vacuum 400. The vapor chamber 210 provides a volume of space for the vapor 600, which forms from the influent liquid 201, to form.

The vapor chamber 210 is preferably equipped with a vacuum release valve 212. Such a vacuum release valve 212 is provided to enable the vapor chamber 210 to return to atmospheric conditions. Occasionally and regularly returning the system 100 to atmospheric conditions allows the influent column 200 to evacuate. Evacuating the influent column 200 creates a back flow of the influent liquid 201 that assists in cleaning the intake screen 206. This also takes the distillation system 100 off line to allow cleaning of the sediment in the wet well 204.

Influent liquids 201 may typically include dissolved gases that "boil-off" of the influent liquid 201 before the liquid goes through phase change into vapor 600. These gases may negatively impact the efficiency of the distillation system 100 and may pollute the effluent liquid 301. Some of these dissolved gases may also be volatile organic compounds (VOCs) as discussed above. Examples of such gases include, but are not limited to, hydrogen sulfide, methane, oxygen, and alcohols.

Referring now to FIGS. 2A and 4A-5B, some embodiments of a distillation system 100 of the present invention may be provided with a gas deflector 220 within the influent column 200, internal to the interior surface 250 of the influent column 200, to vent these unwanted dissolved gases. The gas deflector 220 may be provided with a gas deflector plate 222 connected to a waste gas tube 224. The primary vacuum 400 may be connected to the waste gas tube 224 to vent these unwanted gases to the environment.

Figure 4A:
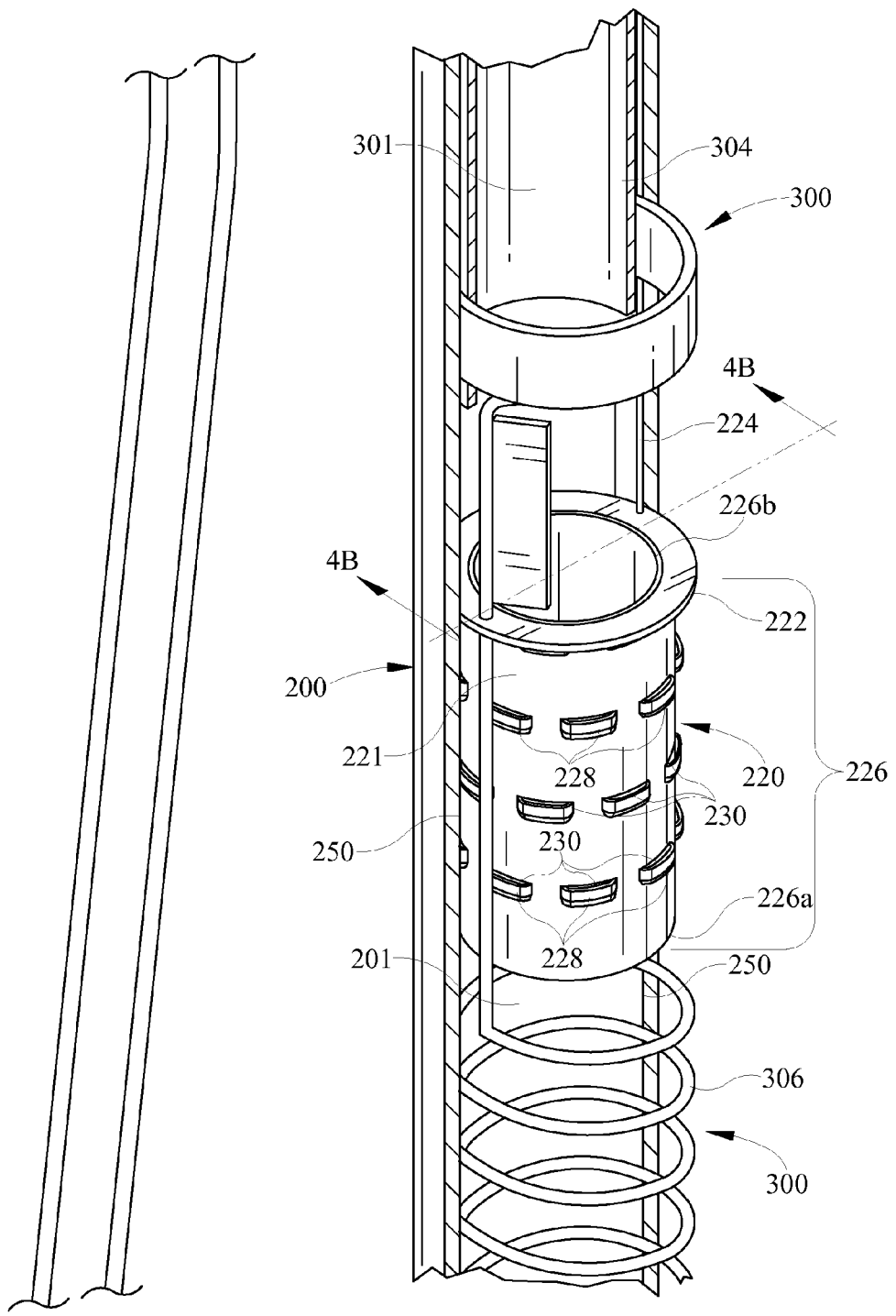
FIG. 4A is a partial perspective view of a gas deflector of an embodiment of the present invention with portions of the influent column and condensation chamber broken away.
Figure 4B:
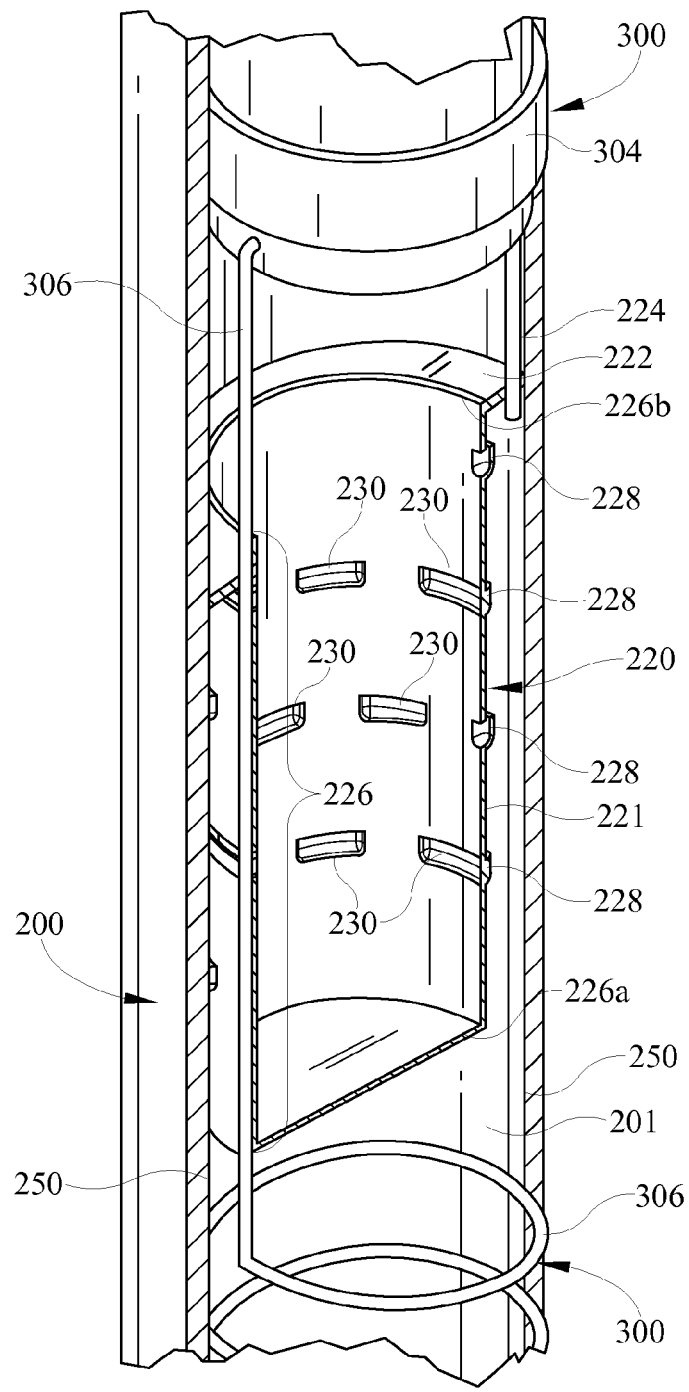
FIG. 4B is a perspective cross-sectional view of the gas deflector embodiment of FIG. 4A, shown along line 4B-4B.
Figure 5A:
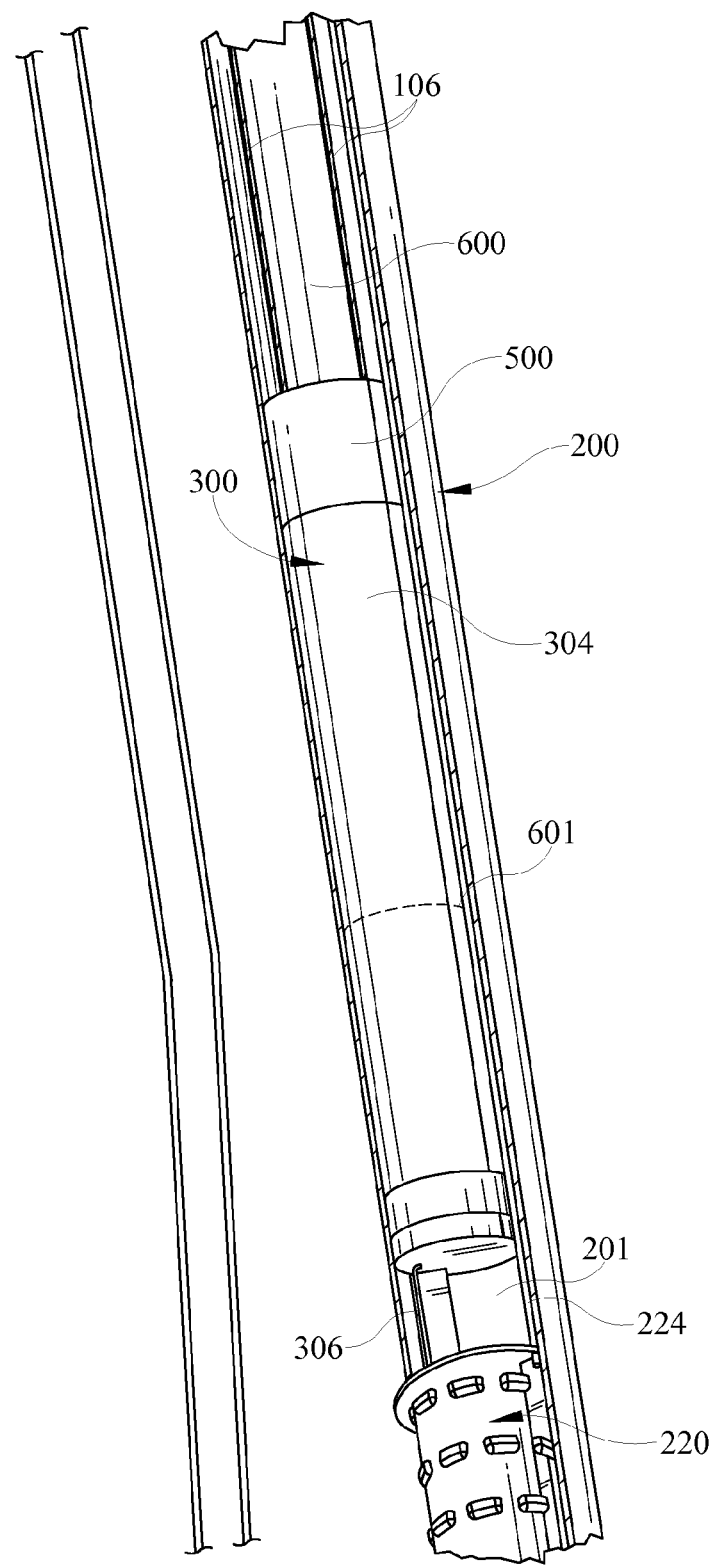
FIG. 5A is a perspective schematic view of a condensation chamber of an embodiment of the present invention, including a blower fixedly mounted on top with portions of the influent column broken away.
Figure 5B:
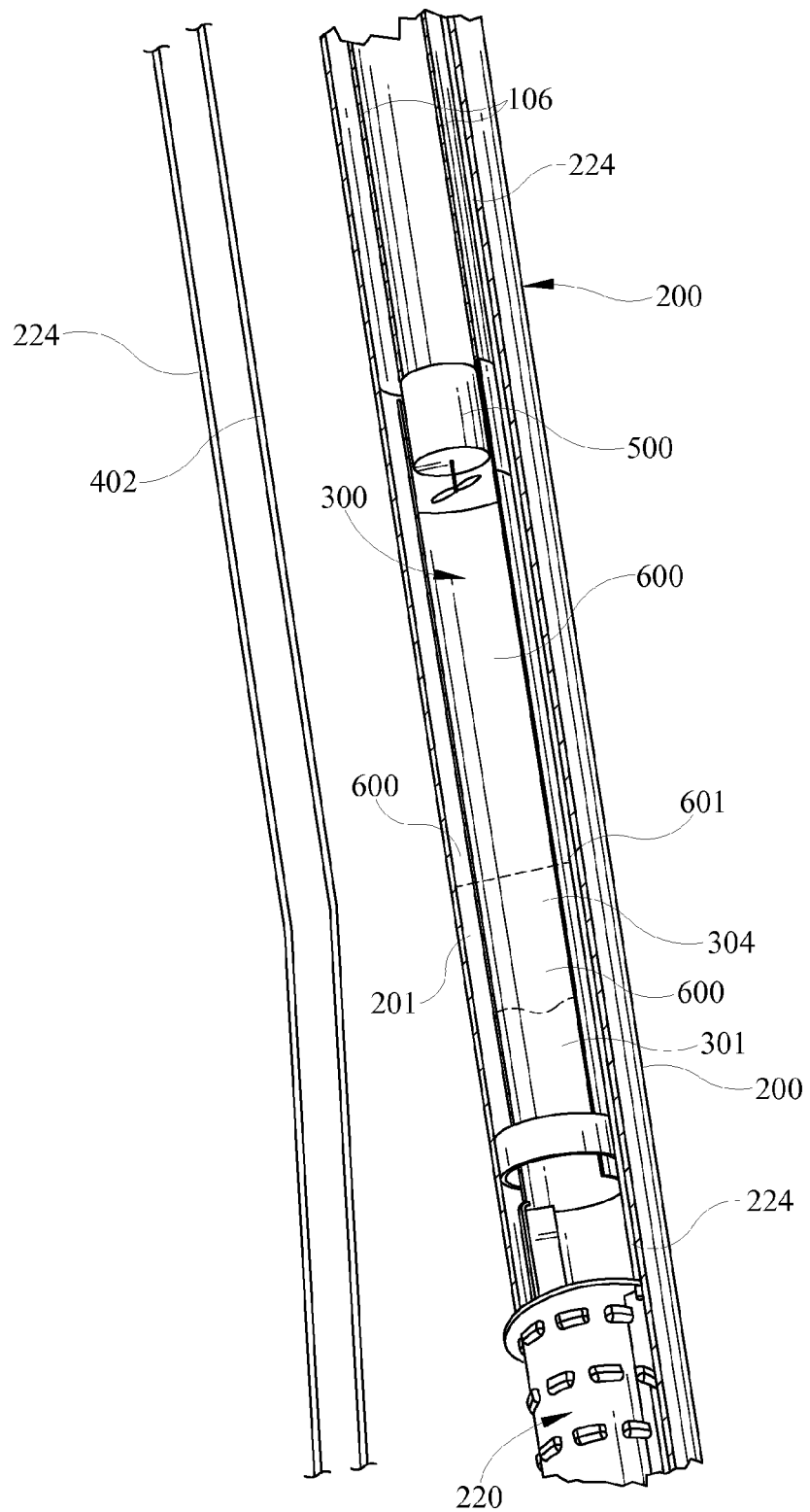
FIG. 5B is a perspective schematic view of the embodiment of FIG. 5A, with portions of the condensation chamber and influent chamber broken away illustrating the effluent liquid and vapor within the condensation chamber.
Figure 6:
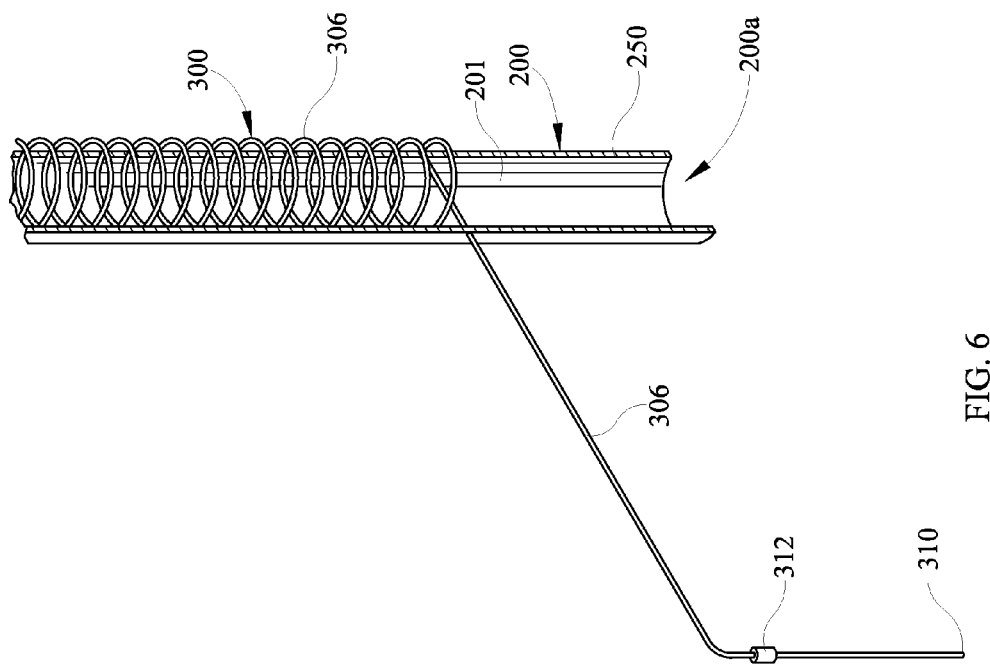
FIG. 6 is a detail of FIG. 2A, illustrating the effluent tube/cooling coil of the effluent column exiting through the influent column.

An embodiment of a gas deflector 220 of the present invention is shown in FIGS. 4A-4B. The deflector 220 has a generally cylindrical shaped body 226 with upwardly angled vanes 228 extending from the body walls 221 toward the gas deflector plate 222 and the interior surface 250 of the influent column 200. The body 226 has a bottom 226a that is closed and a top 226b that is open. While a cylinder is shown for the body 226, many shapes may suffice. Such other shapes may include, but are not limited to, an extruded polygon, a cone, or a frustum. The deflector plate 222 is connected to and extends away from the top of the body 226. The plate 222 is preferably slanted such that it is neither parallel to nor perpendicular with respect to a longitudinal axis of the influent column 200. This slant directs the out-gassed bubbles to one side of the influent column 200, where they are exhausted through the waste gas tube 224.

Openings 230 through the walls 221 adjacent the vanes 228 allow the influent liquid 201 to pass through the deflector 220. Preferably, there are multiple rows of vanes 228 that circumscribe the cylindrical body walls 221 and multiple columns of vanes 228. However, the rows and columns may be offset from one another by a preset angle, or by a simple random orientation. While the unwanted gas bubbles are directed to the interior surface 250 of the influent column 200, the influent liquid 201 may pass through the openings and into the interior of the gas deflector 220.

The waste gas tube 224 is connected to a vacuum source, preferably, for convenience, the primary vacuum 400. Because the interior of the distillation system 100 is at a pressure lower than the atmospheric pressure surrounding the system, the waste tube 224 must be connected to a vacuum source. This will ensure that the gases are vented and that the system does not lose vacuum.

The position of the gas deflector 220 is preferably not far below the bottom of the condensation chamber 304 in order to deflect as many gases as possible. In addition, the gas deflector 220 may hang from the condensation chamber 304. The pressure gradient of the influent liquid 201 is such that at higher elevations in the column, the lower the pressure. Therefore, one should consider the pressure and temperature required to vaporize the targeted VOCs and place the gas deflector 220 at or above the appropriate point in the influent column 200. The higher the deflector 220 placement, the more efficient the deflector will be at removing the targeted VOC. However, if the deflector 220 is too high, it may also eliminate distilled vapor 600 from the influent column 200 as well. Likewise, if the deflector 220 is too low, some of the targeted VOCs may not out-gas until they are above the deflector 220 and thus taint the distilled vapor 600.

Optionally, a portion of the exterior of the gas deflector 220 or a portion of the interior surface 250 of the influent column 200 may have a roughened surface such as to encourage bubble propagation.

Referring now to FIGS. 2A, 2B, and 5A-6, the effluent side of the distillation system 100 may be provided with a condensation chamber 304 and a cooling coil 306. The blower 500 is mounted atop the condensation chamber 304. The blower 500 and condensation chamber 304 assembly may hang from the top plate 406, via brackets 106.

A turbo pump or blower is a quickly rotating impeller that induces a change in pressure between the inlet and the outlet. An axial or centrifugal blower-type pump is suitable for moving high volumes of gas across a small differential pressure. A suitable turbo fan or inline blower may be, for example, Model 12 TA-HP by Composite Fan Technology a Division of Metal Cladding, Inc., 230 South Niagara Street, Lockport, N.Y. 14094.

The blower 500 causes a reduction in pressure in the influent column 200 and an increase in pressure in the effluent column 300. As the vapor 600 passes through the blower 500 to the higher pressure effluent column 300, both the pressure and temperature of the vapor 600 increase according to the ideal gas law. The increase in pressure increases the boiling point of the vapor 600, which may be sufficient to push the vapor 600 across the curve of FIG. 7 to the liquid side and cause condensation. However, if the pressure alone is insufficient to cause complete condensation, the cooler walls of the condensation chamber 304 will cause condensation of the remaining effluent vapor 600.

The condensation chamber 304 walls are cooler than the vapor 600 because the influent liquid 201 is cooler than the effluent vapor 600 and it cools the walls of the condensation chamber 304. The cooled condensation chamber 304 walls thus collect condensation, which runs down the sides and drains into the cooling coil 306. These walls may be smooth or corrugated if the additional surface area is beneficial.

The size of the condensation chamber 304 is a function of the effluent temperature and the blower flow. In a preferred embodiment, the blower 500 may hang on an adjustable support from the top of the distillation system 100 and it should be attached and sealed to the condensation chamber 304. This enables the blower 500 to be moved manually or mechanically up or down with the condensation chamber 304, which may allow the blower 500 to be maintained at an optimum level in relation to the effluent level. In this configuration, the distillation system 100 adapts to the changing environmental and influent conditions. This embodiment may also allow for the use of a shorter condensation chamber 304. A smaller condensation chamber 304 may allow the distillation system 100 to reach optimum operating temperature more quickly because the energy of phase change is applied to a smaller surface. The blower 500 should seal to the condensation chamber 304 to prevent losses. The condensation chamber 304 should be constructed of copper or other thermally conductive material such as to allow efficient heat transfer from the hot effluent vapor 600 and liquid to the cool influent liquid 201.

Another embodiment of the blower 500 and condensation chamber 304 may include a condensation chamber 304 that is approximately 10 feet in length. This embodiment would include the blower 500 being mounted a fixed distance from the top of the distillation system 100 and the ten foot tall condensation chamber 304 securely attached and sealed to the blower 500. This embodiment may have the advantage of not needing to be raised or lowered with changing influent temperatures which may reduce operational manpower requirements.

To arrive at this 10 foot length, one must consider the range of temperatures in which the distillation system 100 may be employed. Referring again to FIGS. 8A and 8B, if the influent liquid 201 temperature is 40° F. (representing operation in colder climates), the influent liquid 201 would boil when the vacuum was reduced to the point that the influent column 200 had a head of approximately 33.6 feet. However, if the influent liquid 201 is 100° F. (representing operation in a very warm climate or a system incorporating supplemental heat), the influent liquid 201 would boil once the vacuum was reduced to the point of creating an approximately 25 foot head. The head difference between a 40° F. influent and a 100° F. influent is approximately 8.6 feet. Therefore, a 10 foot condensation chamber 304 should be sufficient to ensure that a portion of it will be in contact with the influent liquid 201 under all expected operating conditions. In fact, a 10 foot spread in head will provide contact between the condensation chamber 304 and influent liquid 201 for a temperature range of 35° F. to 160° F.

Another embodiment of the blower 500 and condensation chamber 304 may include a container of trapped air attached to the condensation chamber 304. In this embodiment the blower 500 may not be attached to the top plate 406. In this embodiment the blower may be shorter and more economical. This container of air would provide buoyancy to the blower 500 and condensation chamber 304 allowing them to float in the influent liquid 201.

The cooling coil 306 receives the liquid from the condensation chamber 304 and preferably loops many times through the influent column 200 and, because the effluent column 300 resided inside the influent column 200, through the influent liquid 201 to transfer as much remaining heat from the effluent liquid 301 to the influent liquid 201 as practical. FIGS. 2A and 2B show the effluent column 300 has a cooling coil 306. Other methods of heat transfer are possible, such as, but not limited to a shell and tube design, as is shown in FIG. 7. Warming the influent liquid 201 increases the productivity of the system 100, as is explained herein.

The effluent liquid 301 produced by the distillation system 100 exits the system 100 through an effluent discharge 310. The discharge 310 is simply the open end of the cooling coil 306. The effluent discharge 310 may be provided with a valve, a check valve 312 to prevent inflow through the discharge 310, or both. In order for the system to maintain its vacuum (a pressure lower than that of the surrounding atmosphere), the effluent discharge 310 should be immersed in a sufficiently deep pool of effluent liquid 301. Conversely, if such a pool does not exist, or is yet to be created, a preferred embodiment has a check valve 312 at or near the effluent discharge 310.

An alternate embodiment of the effluent discharge system may include a discharge pump 315. The pump 315 is necessary if the fluid is to be discharged at elevations higher than the influent stream elevation. The discharge pump 315 may be part of an aeration system 325, such as, for example, an effluent cascade, diffuse bubbler, or aeration basin.

Details of the components of a first embodiment may be as follows:

| | Welch Model 1400N |
|---|---|
| Primary Vacuum | |
| Flow | 0.9 cfm |
| Ultimate Pressure | 0.00013 mbar |
| Power | 250 watts (⅓ hp) |
| Blower | |
| Flow | 2,000 ACFM |
| Ultimate Δ pressure @ 70° F. & 14.7 p.s.i | 1 psig |
| Ultimate Δ pressure @ 40° F. & 0.12 p.s.i | 0.001 psig |
| Ultimate Δ pressure @ 140° F. & 2.9 p.s.i | 0.1 psig |
| Power required @ STP | 800 watts |
| Influent Tube | HDPE |
| Nominal Diameter | 18 inches |
| Length | 40 ft. |
| Thermal Conductivity BTU-in/ft²/hrs/° F. | 2.7 |
| Color | Black (to promote radiant heat gain) |
| Volume | 31.4 ft³ |
| Wall thickness | 1.0 inch |
| Condensation Chamber | Copper (8" D.W.V.) |
| O.D. | 8.125" |
| I.D. | 7.907" |
| Wall Thickness | 0.109" |
| Length | 10 ft. |
| Volume | 3.41 ft³ |
| Thermal Conductivity BTU-in/ft²/min/° F. | 46.4 |
| Effluent Tube | Copper |
| O.D. | 0.625" |
| I.D. | 0.569" |
| Wall Thickness | 0.028" |
| Length | 100 ft. |
| Thermal Conductivity BTU-in/ft²/min/° F. | 46.4 |
| Color | n/a |
| Illustrative Example of Operation | |
| Influent Type | Seawater |
| Influent Temp. (° F.) | 40 |
| Influent Temp. (° C.) | 4.5 |
| Influent Temp. (° K) | 277 |
| Air Density (lbm/ft³) | 0.075 |
| Water Vapor Density | 0.0004 |
| % of STP mass | 0.53% |

Similar details of the components of a further embodiment are shown below.

| Blower | ΔP (STP) | inches H₂O | 1.5 |
|---|---|---|---|
| Max Fan | Q | cfm | 1300 |
| | flow | cis | 22 |
| | dia | inches | 12 |
| | area | ft₂ | 0.79 |
| | velocity | ft/sec | 28 |

-continued

| | | | |
|---|---|---|---|
| Condensation Chamber | Wall thickness | inches | 0.109 |
| | Diameter | inches | 12 |
| | Height | ft | 1.5 |
| | Chamber Section Area | ft² | 0.79 |
| | Chamber Surface Area | ft² | 5.5 |
| | Chamber Volume | ft³ | 1.18 |
| | Copper Thermal Conductivity | (Btu inches)/(min ° F. ft²) | 46.4 |
| | Chamber transfer/unit area | (Btu)/(min ° F. ft²) | 426 |
| | Chamber transfer Constant | (Btu)/(min ° F.) | 2340 |
| | Chamber transfer Constant | (Btu)/(sec ° F.) | 39 |
| Adjacent Water mass | ID (Efluent pipe) | inches | 18.00 |
| | Efluent Section Area | ft² | 1.77 |
| | ID (cond. Chamber dia) | inches | 12.00 |
| | Height (cond. Chamber she | feet | 1.50 |
| | $V_{OD}=$ | ft² | 2.65 |
| | $V_{ID}=$ | ft² | 1.18 |
| | Vnet | ft³ | 1.47 |
| | Section | ft² | 1.47 |
| | Design Flow | ft³/Day | 133.69 |
| | Design Flow | ft³/sec | 0.0015 |
| | Flow Velocity | ft/sec | 0.0011 |
| | Flow Velocity | ft/hour | 3.8 |
| | Flow Velocity | ft/hour | 90.8 |
| | | lbm | 91.89 |
| cooling coil | Copper Thermal Conductivity | (Btu inches)/(min ° F. ft²) | 46.4 |
| | Nominal Dia. | | 0.25 |
| | Coil Type | | m |
| | OD | in | 0.375 |
| | ID | in | 0.305 |
| | Wall Thickness | in | 0.035 |
| | Wall Thickness | ft | 0.0029167 |
| | section | in² | 0.073 |
| | section | ft² | 0.0005 |
| | efluent flow | ft³/sec | 0.0015472 |
| | efluent velocity | ft/sec | 3.05 |
| | Length | ft | 50 |
| | Surface Area | ft² | 4.9 |
| | HRT | sec | 153 |
| | Cooper Thermal Conductivity | (Btu inches)/(min ° F. ft²) | 46.4 |
| | Cooper Thermal Conductivity | (Btu inches)/(sec ° F. ft²) | 0.7733333 |
| | Cooper Thermal Conductivity/thickness | Btu/(sec ° F. ft²) | 22 |
| | heat transfer capacity | Btu/sec/° F. | 108 |
| | Temp Δ | ° F. | 1 |
| Influent Pipe | Wall thickness | inches | 2 |
| | OD | inches | 22 |
| | ID | inches | 18 |
| | Height | ft | 40 |
| | Chamber Area | ft² | 235.7 |
| | Chamber Volume | ft³ | 105.59 |
| | Copper Thermal Conductivity | (Btu inches)/(min ° F. ft²) | 0.045 |
| | Chamber transfer/unit area | (Btu)/(min ° F. ft²) | 0.0225 |
| | Chamber transfer Constant | (Btu)/(min ° F.) | 5.3 |
| | Chamber transfer Constant | (Btu)/(day ° F.) | 7635 |
| | Chamber transfer Constant | (Btu)/sec ° F.) | 0.0884 |

Operation of the distillation system 100 commences with the first end 200a of the influent column 200, or an extension thereof, immersed in the influent liquid 201 and the effluent check valve 312, if present, in the closed position. The primary vacuum 400 may then be energized. Energizing the primary vacuum 400 begins the pump down cycle, or the cycle that the primary vacuum 400 reduces the system pressure to the point of vaporization. The vaporization equation below calculates the vaporization pressure in pounds per square inch absolute (psia) at a given temperature (° F.).

$$P_{Absolute}(\text{lbm}_{water}/\text{in}^2)=2\times10^{-11}\cdot T^5+2\times10^{-9}\cdot T^4+5\times10^{-8}\cdot T^3+5\times10^{-5}\cdot T^2-0.0005\cdot T+0.0483$$

Thus, if the temperature of the influent were 40° F., the pressure needed would be 0.12 psia.

Figure 10:
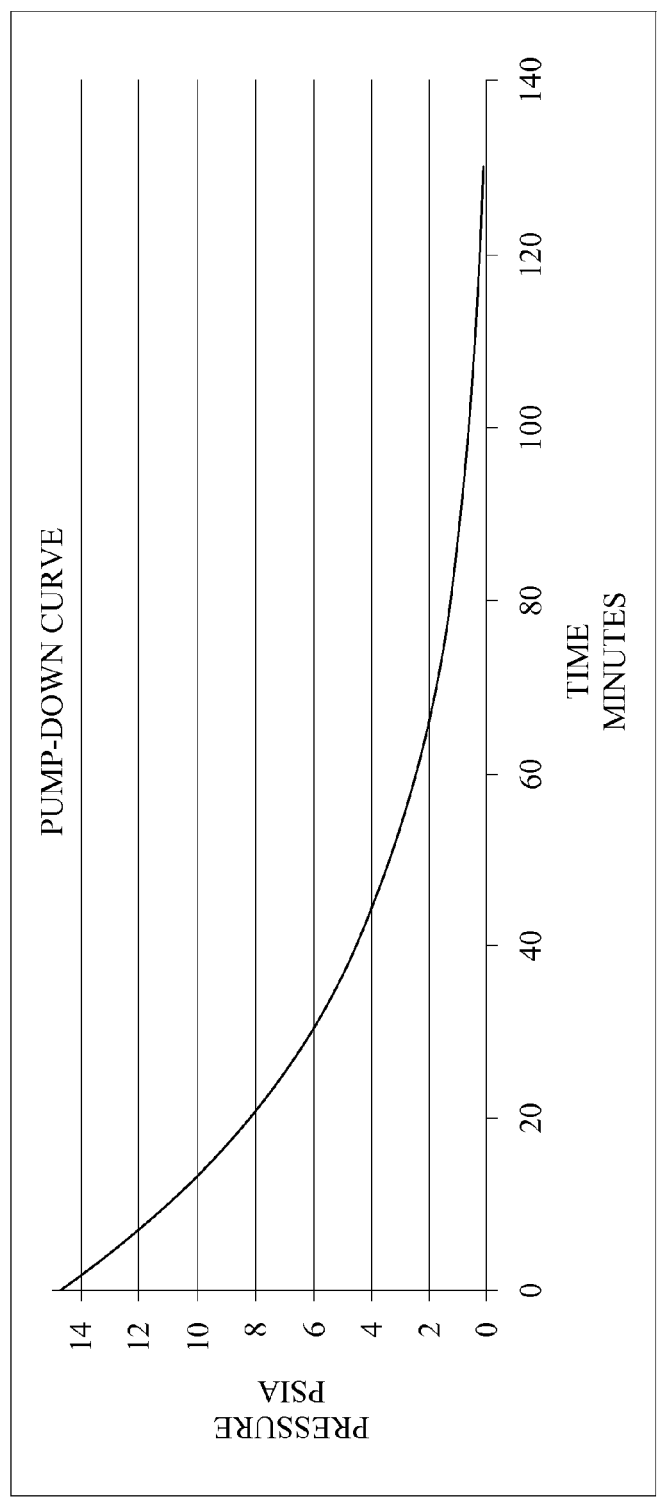
FIG. 10 is a graph showing the time that it takes for a specific vacuum to evacuate an influent column of an embodiment of the present invention.

Referring now to FIG. 10, the time necessary to achieve the target pressure, or pump-down, is a function of the size of the primary vacuum source 400 in relation to the distillation system 100. The equation used to determine the pump-down time is:

$$\text{Time}=-34.39 \ln P+92.426$$

Where time is given in minutes and P is the target pressure of the system 100, given in psia. This equation was developed for the specific influent column 200 and primary vacuum source 400 specified in the first embodiment above and may be provided by the pump manufacturer. For the target pressure of 0.12 psia, the pump-down time will be approximately 130 minutes.

Pump-down time may be reduced by using a larger primary vacuum source 400 than is used in this example. However, because the primary vacuum source 400 will run continuously to remove waste gases, it may be more economical to choose the smallest vacuum that will adequately remove the dissolved gases. If the treatment application requires quick startup (such as a combined sewer overflow), a larger primary vacuum source 400 and supplemental heat may be applied to more quickly achieve maximum production.

When the target pressure is achieved, a portion of the water in the influent column 200 undergoes flash evaporation and changes phase into water vapor 600. This continues until the vapor chamber 210 is full of water vapor 600 at the saturation density and pressure for the influent temperature. At this point the system is static and balanced and the gas being removed from the influent column 200 by the primary vacuum 400 is water vapor 600.

Production of effluent begins when the blower 500 is energized. The blower 500 causes a pressure differential between the influent column 200 and condensation chamber 304. The water vapor 600 in the condensation chamber 304 is pressurized by the blower 500, which causes an increase in pressure and temperature. At the same time, the water vapor 600 in the influent column 200 is being evacuated which lowers the influent column 200 pressure and causes more water to "boil". The mass of water vapor 600 moved from influent to effluent is calculated as follows:

$$(lbm_{Water}/Minute)=Density@Evaporation\ Temperature(lbm/ft^3)\cdot Flow(ft^3/Minute)$$

Figure 11:
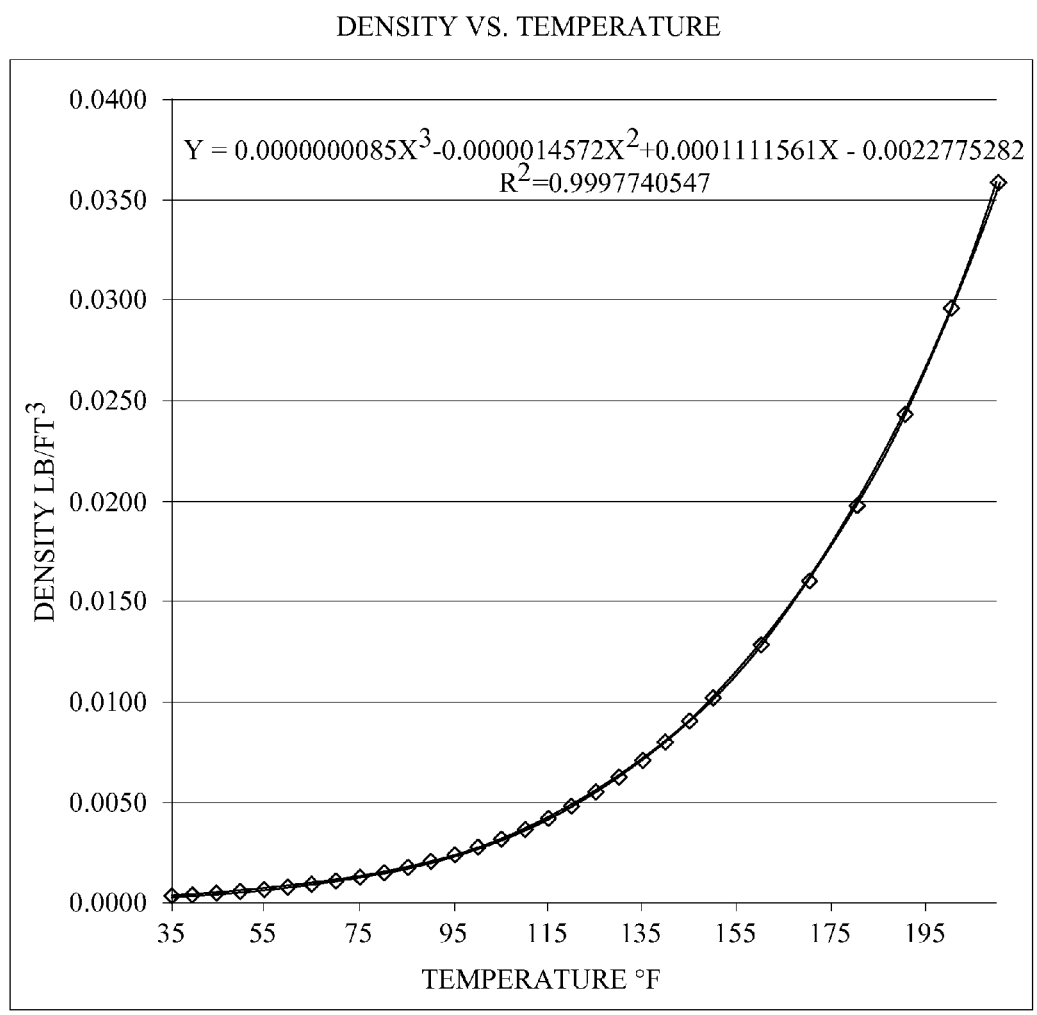
FIG. 11 is a graph showing the relationship between water vapor density and temperature.

Steam at 40° F. has a density of 0.0004 (lbm/ft³), this is shown in FIG. 11. The blower 500 specified in the first embodiment above has a flow rate of 2000 (ft³/min). Under these conditions, the distillation system 100 will produce approximately 138 gallons per day and the calculation is shown below.

$$138(Gallons/Day)=0.8(lbm_{Water}/Minute)=0.0004(lbm/ft^3@40°\ F.)\cdot 2000(ft^3/Minute)$$

However as the distillation system 100 runs for some time, the effluent will warm the influent. Assuming that the energy losses to the external environment will be equal to the energy extracted from the cooling coil. A distillation system 100 operating with the influent at 100° F. would produce water vapor 600 having a density of 0.00289 (lbm/ft³), this is again shown in FIG. 11. The same blower 500 as specified in the first embodiment above would have a max flow rate of 2000 (ft³/min). Under these conditions, the distillation system 100 will produce approximately 1000 gallons per day and the calculation is shown below.

$$1,000(Gallons/Day)=5.8(lbm_{Water}/Minute)=0.00289\ (lbm/ft^3@100°\ F.)\cdot 2000(ft^3/Minute)$$

As the vapor 600 is forced into the condensation chamber 304, it condenses and drains down the cooling coil 306. When the weight of the fluid in the effluent column 300 (cooling coil 306 and condensation chamber 304) exceeds atmospheric pressure, the distilled water exits the system 100 through the check valve 312 into the atmosphere or into an effluent pool or holding vessel 320.

The preceding description describes the flow of water through an embodiment of a distillation system 100 of the present invention. A better understanding of the distillation system 100 may be achieved by describing the flow of energy into and out of the distillation system 100 as described in the following steps.

Step 1: The phase change draws energy at the surface from liquid 201 to vapor 600. As the blower 500 initially starts, the water converts into vapor 600 at the liquid/vapor interface 601. This phase change removes approximately 1,000 Btu per lbm$_{Water}$ from the surrounding water. The influent temperature near the surface drops as energy is drawn from the influent liquid 201 to the vapor 600 due to the endothermic reaction of evaporative phase change.

Step 2: Energy is then added to the vapor 600 by the blower 500 as an increase in pressure. The vapor 600 is pulled into the blower 500 from the influent column 200. As the vapor 600 exits the influent column 200, energy added to the vapor 600 by the blower 500 increases the pressure in the condensation chamber 304 causing the temperature to increase in accordance with the combined gas law, which is reproduced below.

$$\frac{P_1\cdot V_1}{T_1}=\frac{P_2\cdot V_2}{T_2}$$

Step 3: Energy is released onto the walls of the condensation chamber 304. The higher pressure and cool walls cause the vapor 600 to condense (an exothermic reaction), which releases the energy added to the water vapor 600 in steps one and two above.

Step 4: Energy of phase change is conducted through the condensation chamber 304 walls to support further evaporation. The blower 500 has continued to remove vapor 600 from the influent column 200 causing continued phase change. This requires a continuous stream of energy that is provided by the heated walls of the condensation chamber 304 discussed in the above Step 3. The energy required for continued evaporation is equal to the energy released by the phase change back to liquid.

Step 5: Energy is then applied to the influent liquid 201 adjacent to the condensation chamber. The energy added under Step 2 is in excess of that needed for phase change. The additional energy passes through the chamber walls and increases the temperature of the influent.

Step 6: The process continues to improve until an energy balance is achieved. If the distillation system is properly sized, the blower 500 and the condensation chamber 304 will be functioning at or near capacity when the design operational temperature is achieved.

Step 7: Excess energy is lost to the environment. After that point in step six, the fluid in the cooling coil 306 is warmer than the influent liquid 201. This excess energy is transferred through the walls of the cooling coil and heats the influent liquid 201. Ultimately, it passes from the distillation system into the environment. The environmental losses will include convection from the influent column 200, exhaust from the primary vacuum source 400, and warming of the final effluent 301.

While the preferred embodiment is shown as a stationary system, various portability options are available for the distillation system 100. These options include a design that may be hauled by semi or locomotive, or both. Such a transportable distillation system may prove vital in disaster relief scenarios when potable water may become a scarce commodity.

The device is scalable and duplicateable. Certain economies of scale are expected with the installation of banks of the distillation system due to the sharing of a primary vacuum source 400 and through the increase in ambient temperature in a building with several units in operation. Furthermore, the entirety of the internal components of the distillation system 100 may hang from the top plate 406, either directly or indirectly. This configuration may allow for the top plate 406 to be removed in a vertical direction and subsequently pull the internal components from with the influent column 200, allowing for maintenance work, repairs, and cleaning to be performed on such internal components.

Additional embodiments and applications are possible. In a combined sewer overflow application, the solids would drop back into the sewage stream and continue to a waste water treatment plant as part of a more concentrated waste stream. In a riverine system, the solids would drop back into the river and continue downstream. In a desalination system, the salts could be captured and processed. Alternately, the desalination system could be installed offshore and the salts be allowed to fall back into the ocean. In a waste water treatment plant application, the solids would drop into a handling tank or wet well 204. This solids handling tank may be anaerobic which may provide opportunities for methane capture. This methane could be used to apply supplemental heat to the influent stream. Additionally, using a second application of vacuum extraction on the sludge solids at the waste water treatment plant may effectively dewater the sludge and produce a suitable material for landfills.

While various options and embodiments have been disclosed, it is intended that the scope of the present invention will only be limited to the scope of the claims listed herein.

The invention claimed is:

1. A distillation system comprising:
a substantially vertical influent column having an influent column first end and an influent column second end and including therein a gas deflector, said influent column containing at least an influent liquid and a vapor from said influent liquid, wherein said gas deflector is positioned within said influent liquid, said influent column first end in fluid communication with an influent liquid source;
at least one substantially vertical effluent column having an effluent column first end and an effluent column second end and further comprising a condensation chamber adjacent said effluent column second end, said effluent column positioned within said influent column and containing at least an effluent liquid and said vapor therein;
said condensation chamber is vertically positionable within said influent liquid of said influent column between a first vertical position and a second vertical position relative to said influent liquid of said influent column, wherein said first vertical position is different relative to said second vertical position, wherein said condensation chamber is configured to move up and down with the level of said influent liquid;
a primary vacuum source in fluid communication with said influent column and positioned at said influent column second end; and
a blower connected to said condensation chamber.

2. The distillation system of claim 1, wherein said influent liquid source is non-potable water.

3. The distillation system of claim 1, wherein said effluent liquid is potable or near-potable water.

4. The distillation system of claim 1, wherein said condensation chamber contains a portion of said vapor and a portion of said effluent liquid, wherein a phase change interface exists between said portion of said vapor and a said portion of said effluent liquid.

5. The distillation system of claim 1, wherein a heat source is applied to said influent liquid.

6. The distillation system of claim 5, wherein said heat source is waste heat from said blower.

7. The distillation system of claim 1, wherein a heat source is applied to said influent liquid source.

8. The distillation system of claim 1, wherein said influent liquid source enters said system at atmospheric pressure.

9. A distillation system comprising:
an influent column having a first end and a second end, wherein said first end of said influent column is fluidly connected to a source of influent liquid;
a gas deflector positioned inside said influent liquid of said influent column, said gas deflector having openings therein and vanes thereon to allow said influent liquid to pass therethrough towards a liquid/vapor interface while preventing gases from passing therethrough and instead directing gases to be expelled from said influent column;
a vacuum source fluidly connected to said second end of said influent column via a vapor chamber so as to reduce the pressure within said influent column to below atmospheric conditions so as to create said liquid/vapor interface at a location above said first end of said influent column and below said second end of said influent column;
a blower fluidly connected to said vapor chamber and having an inlet and an outlet, said inlet receiving vapor at a first pressure and said outlet producing vapor at a second pressure that is higher than said first pressure;
a condensation chamber fluidly connected to said blower and receiving vapor at said second pressure, said condensation chamber further comprising sidewalls which condense said vapor to form an effluent liquid;
said condensation chamber is situated within said influent column, wherein said condensation chamber is vertically positionable within said influent liquid of said influent column between a first vertical position and a second vertical position relative to said influent liquid of said influent column, wherein said first vertical position is different relative to said second vertical position, wherein said condensation chamber is configured to move up and down with the level of said influent liquid; and
an effluent cooling tube fluidly connected to said condensation chamber to convey said effluent liquid to an effluent liquid receptacle.

10. The distillation system of claim 9, wherein said gas deflector further comprises a deflector plate angled with respect to a longitudinal axis of said influent column.

11. The distillation system of claim 9, wherein said influent column further comprises a screen therein near said first end to keep a portion of solids present in said source of influent liquid from rising in said influent column.

12. The distillation system of claim 9, wherein a supplemental heat source is applied to said influent liquid near said source of influent liquid to raise its temperature.

13. The distillation system of claim 9, wherein a supplemental heat source is applied to said influent liquid near said liquid/vapor interface to raise its temperature.

14. The distillation system of claim 9, wherein said gas deflector further comprises a gas vent tube fluidly connected to said vacuum source to vent gases externally of said influent column.

15. The distillation system of claim 9, wherein said influent fluid is non-potable water.

16. The distillation system of claim 9, wherein said effluent fluid is potable or near-potable water.

17. The distillation system of claim 9, wherein said effluent cooling tube is situated within said influent column.

18. A distillation system comprising:
a vertically oriented elongated influent column having a first end and a second end, wherein said first end is fluidly connected to a source of influent liquid;
a vacuum source fluidly connected to said second end of said influent column to reduce the internal pressure within said influent column below atmospheric pressure to raise a column of influent liquid therein to a vaporization height that represents a maximum height at which point said influent liquid undergoes phase change from liquid to gas at a liquid/vapor interface;
said influent column second end being located vertically higher than said liquid/vapor interface so as to create a vaporization chamber within said influent column between said liquid/vapor interface and said second end of said influent column;

said condensation chamber and said effluent cooling conduit are positioned within said influent column;

a blower in fluid communication with said vaporization chamber to receive vapor at a first pressure and convey said vapor to said condensation chamber at a second pressure, wherein said second pressure is higher than said first pressure and said vapor condenses to form an effluent liquid;

said condensation chamber is vertically positionable within said influent liquid of said influent column between a first vertical position and a second vertical position relative to said influent liquid of said influent column, wherein said first vertical position is different relative to said second vertical position, wherein said condensation chamber is configured to move up and down with the level of said influent liquid;

said effluent cooling conduit to receive said effluent liquid from said condensation chamber and convey said effluent liquid to an effluent liquid receptacle.

19. The distillation system of claim 18, further comprising a gas deflector having a deflector plate angled with respect to a longitudinal axis of said influent column.

20. The distillation system of claim 18, wherein said influent column further comprises a screen therein near said first end to keep a portion of solids present in said source of influent liquid from rising in said influent column.

21. The distillation system of claim 18, wherein a supplemental heat source is applied to said influent liquid near said source of influent liquid to raise its temperature.

22. The distillation system of claim 18, wherein a supplemental heat source is applied to said influent liquid near said liquid/vapor interface to raise its temperature.

23. The distillation system of claim 18, further comprising a gas deflector having a gas vent tube fluidly connected to said vacuum source to vent gases externally of said influent column.

24. The distillation system of claim 18, wherein said influent fluid is non-potable water.

25. The distillation system of claim 18, wherein said effluent fluid is potable or near-potable water.

26. The distillation system of claim 18, wherein said condensation chamber is buoyant within said influent liquid.

27. The distillation system of claim 18, wherein said condensation chamber is manually positioned between said first vertical position and said second vertical position.

* * * * *